(12) United States Patent
Takayama

(10) Patent No.: US 10,623,631 B2
(45) Date of Patent: Apr. 14, 2020

(54) IMAGING APPARATUS

(71) Applicant: Panasonic Intellectual Property Management Co., Ltd., Osaka (JP)

(72) Inventor: Koji Takayama, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 32 days.

(21) Appl. No.: 16/010,232

(22) Filed: Jun. 15, 2018

(65) Prior Publication Data
US 2018/0295280 A1 Oct. 11, 2018

Related U.S. Application Data

(63) Continuation of application No. PCT/JP2017/039218, filed on Oct. 31, 2017.

(30) Foreign Application Priority Data

Mar. 31, 2017 (JP) ................... 2017-069630

(51) Int. Cl.
*H04N 5/225* (2006.01)
*H04N 5/232* (2006.01)
(Continued)

(52) U.S. Cl.
CPC ..... *H04N 5/23219* (2013.01); *G06K 9/00228* (2013.01); *G06K 9/00288* (2013.01); *H04N 5/23245* (2013.01); *H04N 5/2621* (2013.01)

(58) Field of Classification Search
CPC ................................................. H04N 5/23219
See application file for complete search history.

(56) References Cited

U.S. PATENT DOCUMENTS

| 2004/0081338 A1* | 4/2004 | Takenaka ........... G06K 9/00221 382/118 |
| 2004/0145659 A1 | 7/2004 | Someya et al. |

(Continued)

FOREIGN PATENT DOCUMENTS

| JP | 2004-228808 | 8/2004 |
| JP | 2004-280142 | 10/2004 |

(Continued)

OTHER PUBLICATIONS

International Search Report of PCT application No. PCT/JP2017/039218 dated Jan. 30, 2018.

*Primary Examiner* — Twyler L Haskins
*Assistant Examiner* — Dwight Alex C Tejano
(74) *Attorney, Agent, or Firm* — Renner, Otto, Boisselle & Sklar, LLP

(57) ABSTRACT

Imaging apparatus includes storage that records registration information, including face information, for personal authentication, setting unit that selects a security mode from a plurality of security modes, imaging unit that generates first image data from optical information, detector that detects a face of a subject within the first image data and detects the security-protection target according to a result from a comparison between the face detected and the face information recorded, image processor that executes the security-protection process on the security-protection target detected by detector to generate second image data, and controller that controls detector and image processor in accordance with the security mode selected. The plurality of security modes include a first security mode and a second security mode. The first security mode sets, as the security-protection target, the face information not included in the registration information, and the second security mode sets, (Continued)

as the security-protection target, the face information included in the registration information.

10 Claims, 16 Drawing Sheets

(51) Int. Cl.
  *H04N 5/262* (2006.01)
  *G06K 9/00* (2006.01)

(56) References Cited

U.S. PATENT DOCUMENTS

| | | | | |
|---|---|---|---|---|
| 2006/0206911 A1* | 9/2006 | Kim | ................. | G08B 13/19686 725/12 |
| 2008/0180539 A1* | 7/2008 | Jung | .................... | G11B 27/034 348/222.1 |
| 2008/0193018 A1* | 8/2008 | Masuda | ............. | G06K 9/00228 382/190 |
| 2009/0207269 A1* | 8/2009 | Yoda | ....................... | G06T 11/60 348/222.1 |
| 2012/0099002 A1* | 4/2012 | Lee | .................... | H04N 5/23219 348/239 |
| 2015/0104103 A1* | 4/2015 | Candelore | .......... | G06K 9/00288 382/195 |
| 2016/0050341 A1* | 2/2016 | Erdler | .................... | H04N 1/444 380/245 |
| 2016/0307600 A1* | 10/2016 | Koide | ................. | G11B 27/036 |
| 2017/0126907 A1 | 5/2017 | Tamura et al. | | |

FOREIGN PATENT DOCUMENTS

| | | |
|---|---|---|
| JP | 2009-081635 | 4/2009 |
| JP | 2009-284235 | 12/2009 |
| JP | 2010-021921 | 1/2010 |
| JP | 2014-067131 | 4/2014 |
| WO | 2015/186447 | 12/2015 |

* cited by examiner

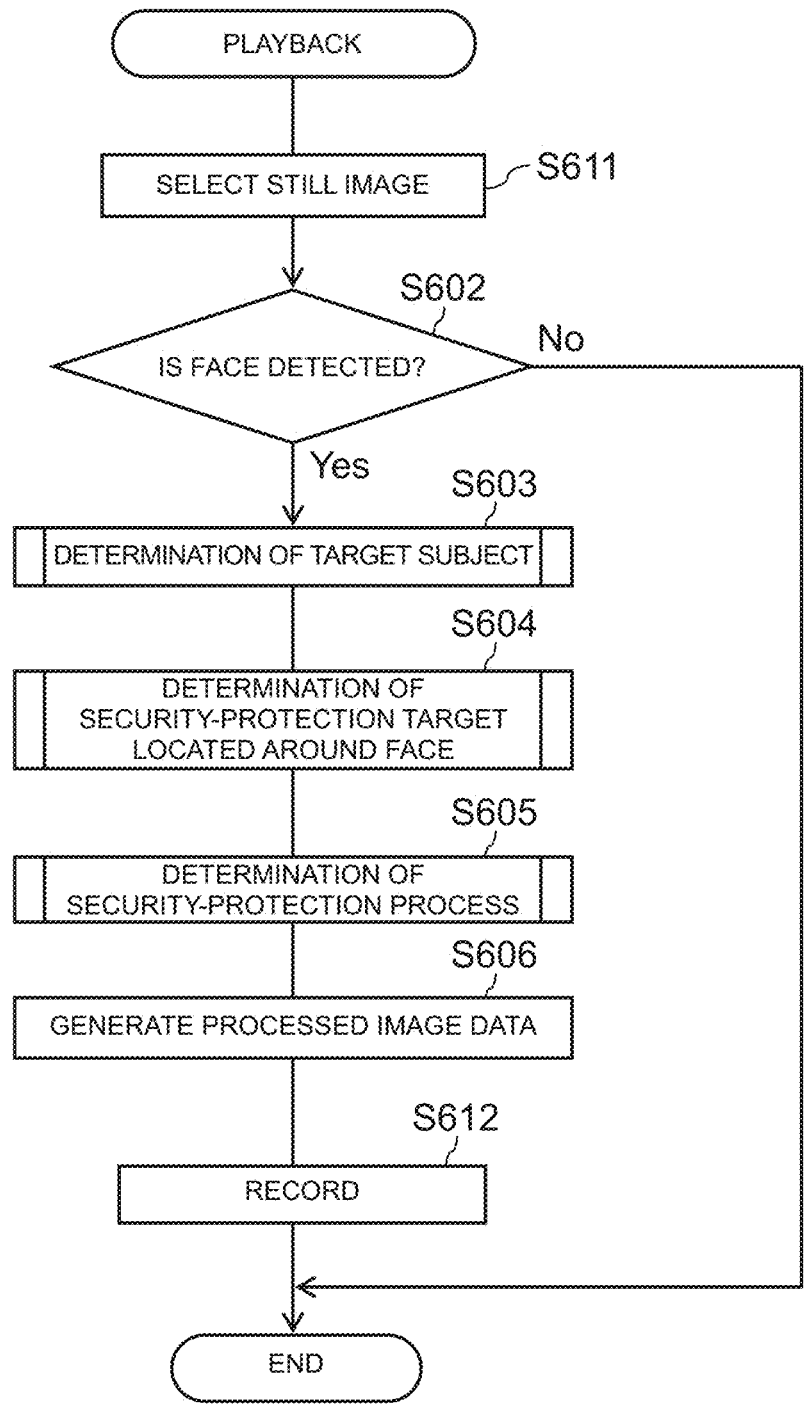

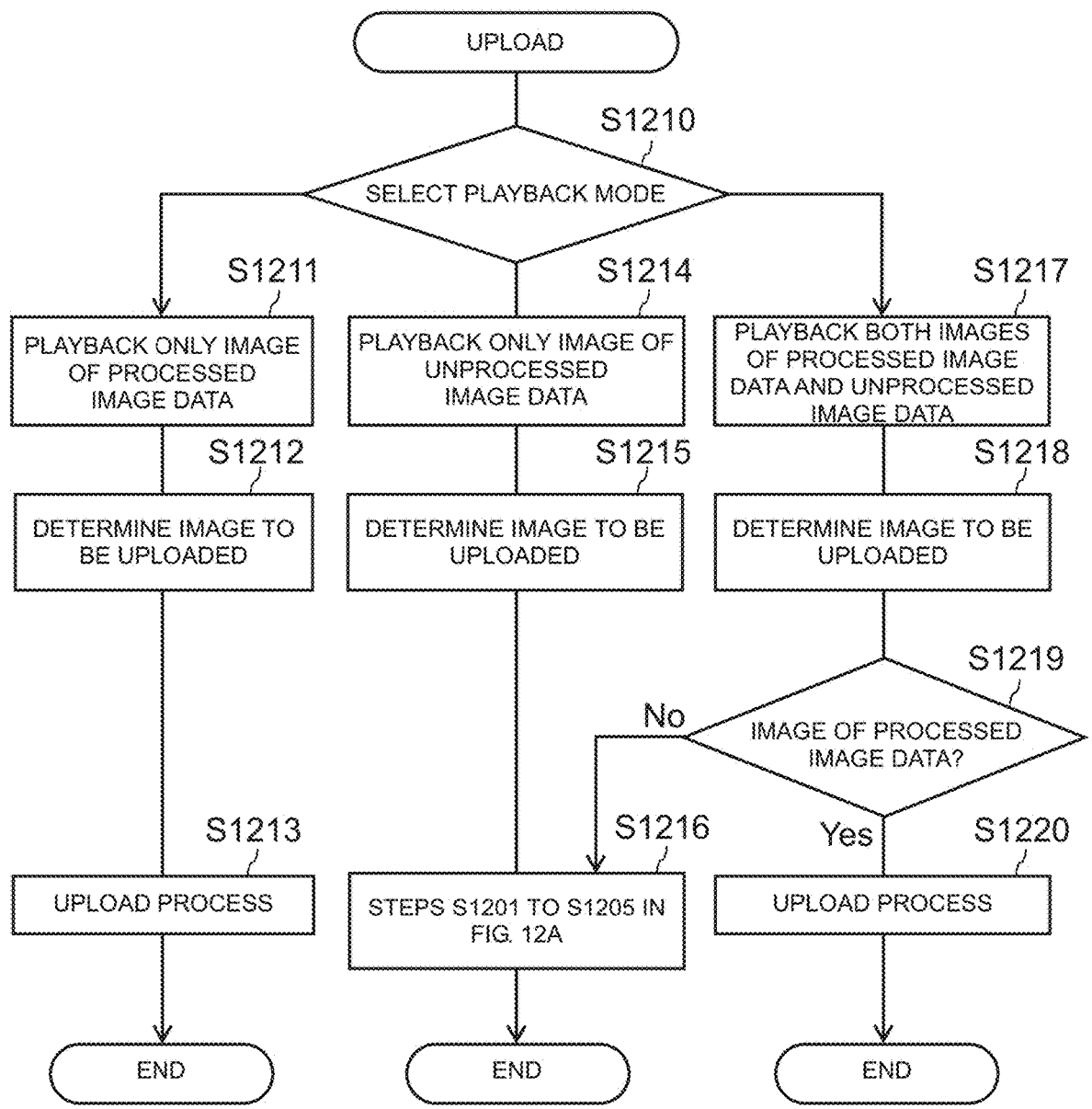

FIG. 16

SELECT TARGET SUBJECT

■ V : REFERENCE TO NECESSITY OR UNNECESSITY OF SECURITY-PROTECTION PROCESS ON PROFILE

■ N : FACE UNREGISTERED FOR PERSONAL AUTHENTICATION

☐ W : FACE REGISTERED FOR PERSONAL AUTHENTICATION

☐ OFF

SELECT WHETHER TO RECORD SIMULTANEOUSLY WITH SECURITY-PROTECTION UNPROCESSED IMAGE DATA

■ /1 : RECORD SIMULTANEOUSLY

☐ /2 : RECORD SEPARATELY (RECORD ONLY PROCESSED IMAGE DATA)

☐ /3 : DELETE PROCESSED IMAGE DATA AFTER UPLOAD

340

IMAGING APPARATUS

BACKGROUND

1. Technical Field

The present disclosure relates to an imaging apparatus that protects personal information included in a shot image.

2. Description of the Related Art

In proportion to an increase in resolution of digital cameras from high definition (HD) to 4K, 6K, 8K, personal information on subjects is more easily extracted from shot images such as moving images and still images. Therefore, it is likely that the need for protecting personal information included in shot images will intensify. A technique for protecting personal information included in shot images has been required particularly for a case where information is spread onto, for example, a social networking service (SNS). Unexamined Japanese Patent Publication No. 2009-81635 discloses a technique for protecting personal information included in images.

SUMMARY

The present disclosure can improve user convenience in a case where personal information included in shot images is protected.

An imaging apparatus according to a first aspect of the present disclosure includes a storage, a setting unit, an imaging unit, a detector, an image processor, and a controller. The storage records registration information, including face information, for personal authentication. The setting unit selects a security mode from a plurality of security modes, each of the plurality of security modes having a unique security-protection target. The imaging unit generates first image data from optical information. The detector detects a face of a subject within the first image data and detects the security-protection target according to a result from a comparison between the face detected and the face information included in the registration information. The image processor executes a security-protection process on the security-protection target detected by the detector to generate second image data. The controller is configured to cause the detector to detect the security-protection target in accordance with the security mode selected. The controller is configured to cause the image processor to execute the security-protection process in accordance with the security mode selected. The plurality of security modes include a first security mode and a second security mode. The first security mode is a mode in which another face information not included in the registration information is set as the security-protection target. The second security mode is a mode in which the face information included in the registration information is set as the security-protection target.

BRIEF DESCRIPTION OF THE DRAWINGS

FIG. 6B is a flowchart illustrating a still image playback operation of the digital camera according to a second exemplary embodiment;

FIG. 12B is a flowchart illustrating an upload process according to a third exemplary embodiment;

FIG. 16 is a diagram illustrating a screen of a detailed setting of the security mode according to another example of the fourth exemplary embodiment; and FIG. 17 is a diagram illustrating a screen of a detailed setting of the security mode according other exemplary embodiments.

DETAILED DESCRIPTION

Exemplary embodiments will be described in detail below with reference to the drawings as appropriate. However, detailed descriptions that are more than necessary may be omitted. For example, a detailed description of well-known matters and a duplicate description of substantially identical configurations may be omitted. Such omissions are made in order to avoid unnecessary redundancy of the following description and to facilitate the understanding of those skilled in the art.

First Exemplary Embodiment

The first exemplary embodiment describes a digital camera as an example of an imaging apparatus. The first exemplary embodiment allows a user to select a desired security mode from a plurality of security modes before shooting. The digital camera executes a security-protection process on a shot image in accordance with the selected security mode.

[1. Configuration of Digital Camera]

Figure 1:
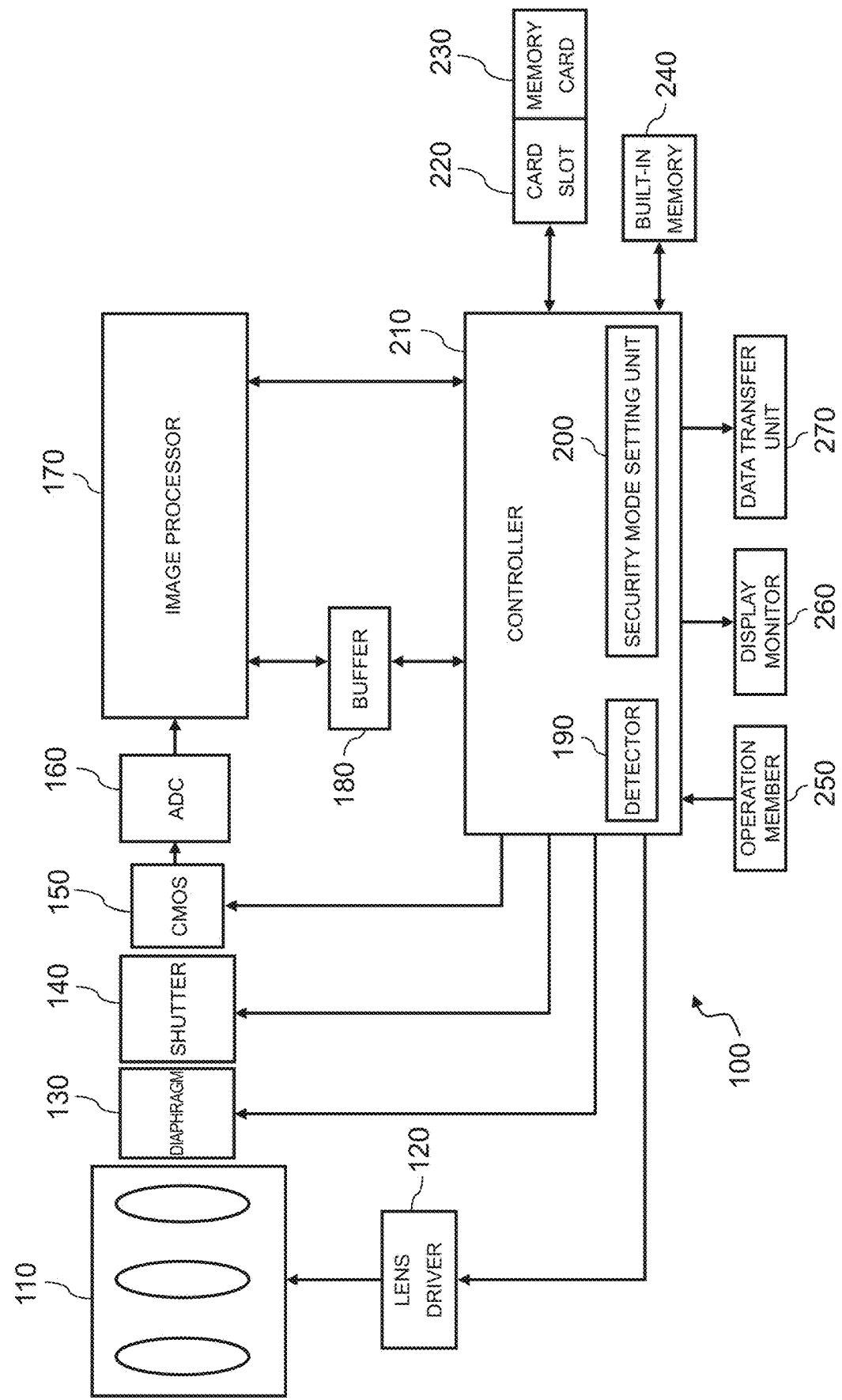
FIG. 1 is an electrical configuration diagram of a digital camera according to a first exemplary embodiment.

An example of an electrical configuration of the digital camera according to the first exemplary embodiment will be described with reference to FIG. 1. FIG. 1 is a block diagram illustrating a configuration of digital camera 100. Digital camera 100 is an imaging apparatus that causes complementary metal oxide semiconductor (CMOS) imaging sensor 150 to capture a subject image formed by optical system 110.

Image data generated by CMOS imaging sensor 150 is subjected to various kinds of processing by image processor 170 and is then stored in memory card 230. The configuration of digital camera 100 will be described in detail below.

Optical system 110 includes one or a plurality of lenses. Optical system 110 includes, for example, a zoom lens and a focusing lens. The subject image can be enlarged or reduced by moving the zoom lens along an optical axis. Furthermore, a focus on the subject image can be adjusted by moving the focusing lens along the optical axis.

Lens driver 120 drives various kinds of lenses included in optical system 110. Lens driver 120 includes, for example, a zoom motor that drives the zoom lens and a focus motor that drives the focusing lens.

Diaphragm 130 adjusts a size of an aperture for light according to a user's setting or automatically to thereby adjust an amount of light transmitting through the aperture.

Shutter 140 is a unit for shielding light to be transmitted to CMOS imaging sensor 150. Shutter 140, optical system 110, and diaphragm 130 constitute an optical system unit that controls optical information indicating the subject image.

CMOS imaging sensor 150 captures the subject image formed by optical system 110, and generates image data. CMOS imaging sensor 150 includes a color filter, a light-receiving element, and an auto gain controller (AGC). The light-receiving element converts an optical signal of light collected by optical system 110 into an electrical signal and generates image information. The AGC amplifies the electrical signal output from the light-receiving element. CMOS imaging sensor 150 further includes a drive circuit and the like that perform various kinds of operations such as exposure, transfer, and electronic shutter control.

Analog-digital converter (A/D converter: ADC) 160 converts analog image data generated by CMOS imaging sensor 150 into digital image data.

Under control of controller 210, image processor 170 performs various kinds of processing on the digital image data generated by CMOS imaging sensor 150 and converted. For example, image processor 170 performs various kinds of processing, such as Gamma correction, white balance correction, and damage correction, on the image data generated by CMOS imaging sensor 150. Furthermore, image processor 170 compresses the image data generated by CMOS imaging sensor 150 according to a compression format that complies with 11.264 standards or MPEG2 standards.

Image processor 170 generates image data to be displayed on display monitor 260. Furthermore, image processor 170 generates image data to be stored in memory card 230. Image processor 170 can be implemented, for example, by a digital signal processor (DSP) or a microcontroller.

Furthermore, image processor 170 can generate image data of a still image and image data of a moving image (4K moving image data) of approximately 4000×2000 pixels based on the image data generated by CMOS imaging sensor 150. Alternatively, digital camera 100 may be configured to set image quality of moving image data to 8000×4000 (8K) pixels. Furthermore, image processor 170 executes the security-protection process on the image data generated by CMOS imaging sensor 150 to generate security-protection processed image data.

Hereinafter, the security-protection processed image data is referred to as processed image data. The processed image data corresponds to second image data according to the present disclosure. Furthermore, the image data on which the security-protection process has not been executed is referred to as unprocessed image data. The unprocessed image data corresponds to first image data according to the present disclosure.

Furthermore, the security-protection process includes, for example, at least one of a blur process, a pixelation process, and a mask process. The blur process includes a noise reduction process. The mask process is configured to superimpose at least one of a stamp, an eye mask, and the like on an image or replace the image with at least one of the stamp, the eye mask, and the like. The image processor 170 executes such a security-protection process to generate the processed image data. Controller 210 distinguishes the processed image data from the unprocessed image data.

Detector 190 is configured to detect personal information within the image data processed by image processor 170. Personal information is identification information for identifying an individual, and includes at least one of a face, a name, a fingerprint, and the like.

Herein, detector 190 is, for example, configured to use a known face recognition technique to detect a face of a subject within the image data.

Detector 190 is further configured to use a known character recognition technique to detect a character. In a case where the detected character is located close to the detected face, determination is made that the detected character is a name tag. Such a name tag typically has a name written thereon. Specifically, detector 190 is configured to detect such a name.

Detector 190 is further configured to detect a skin-colored portion within an area around the detected face. In a case where the detected skin-colored portion is located close to the face, determination is made that the detected skin-colored portion includes a hand. Further, such a hand includes a fingerprint; thus, determination is made that the detected skin-colored portion includes a fingerprint. Specifically, detector 190 is configured to detect a fingerprint. Note that detector 190 may be configured to detect a palm or a finger within an image pattern around the detected face.

Furthermore, in a case where face information on a specific individual is registered in at least one of registration information for personal authentication and registration information such as a profile of a subject, detector 190 is configured to use the face recognition technique to detect a face within a shot image and further identify whether the detected face is identical to the registered face information, as described below.

Security mode setting unit 200 selects a desired security mode from the plurality of security modes and sets the desired security mode. Security mode setting unit 200 is connected to display monitor 260 and operation member 250. A user uses operation member 250 to select the security mode in accordance with a setting screen on display monitor 260. Operation member 250 receives a user's selection and outputs the user's selection to security mode setting unit 200.

Controller 210 is a control unit that entirely controls digital camera 100. Controller 210 enables respective functions of detector 190 and security mode setting unit 200. Controller 210 can be implemented by a semiconductor element, for example. Controller 210 may be configured by hardware alone or may be implemented by a combination of hardware and software. Controller 210 can be implemented by, for example, a microcontroller, a central processing unit (CPU), a micro processing unit (MPU), an application specific integrated circuit (ASIC), or a field-programmable gate array (FPGA).

Buffer 180 functions as a work memory of image processor 170 and controller 210. Buffer 180 can be implemented by, for example, a dynamic random access memory (DRAM) or a ferroelectric memory.

Card slot 220 is capable of detachably accepting memory card 230. Memory card 230 is mechanically and electrically connected to card slot 220.

Memory card 230 incorporates, for example, a flash memory or a ferroelectric memory. Memory card 230 is configured to store data such as an image file generated by image processor 170.

Built-in memory 240 is, for example, a flash memory or a ferroelectric memory. Built-in memory 240 stores a control program for entirely controlling digital camera 100, and the like.

Operation member 250 is a generic term of a user interface that receives a user's operation. Operation member 250 includes at least one of a button, a dial, a lever, a touch panel, and the like. The touch panel is disposed integrally with display monitor 260. The button includes, for example, selection button 213 and determination button 214 illustrated in FIG. 2.

Display monitor 260 is configured to display at least one of an image (a through image) indicated by the image data generated by CMOS imaging sensor 150 and an image indicated by image data read from memory card 230. Display monitor 260 is further configured to display various menu screens for making various settings of digital camera 100. Display monitor 260 is configured by a liquid crystal display device or an organic electro luminescence (EL) display device.

Data transfer unit 270 is configured to upload the image data generated by image processor 170 onto, for example, an SNS. The user uses operation member 250 to select and determine an image to be uploaded from images displayed on display monitor 260 in accordance with a screen displayed on display monitor 260.

Figure 2:
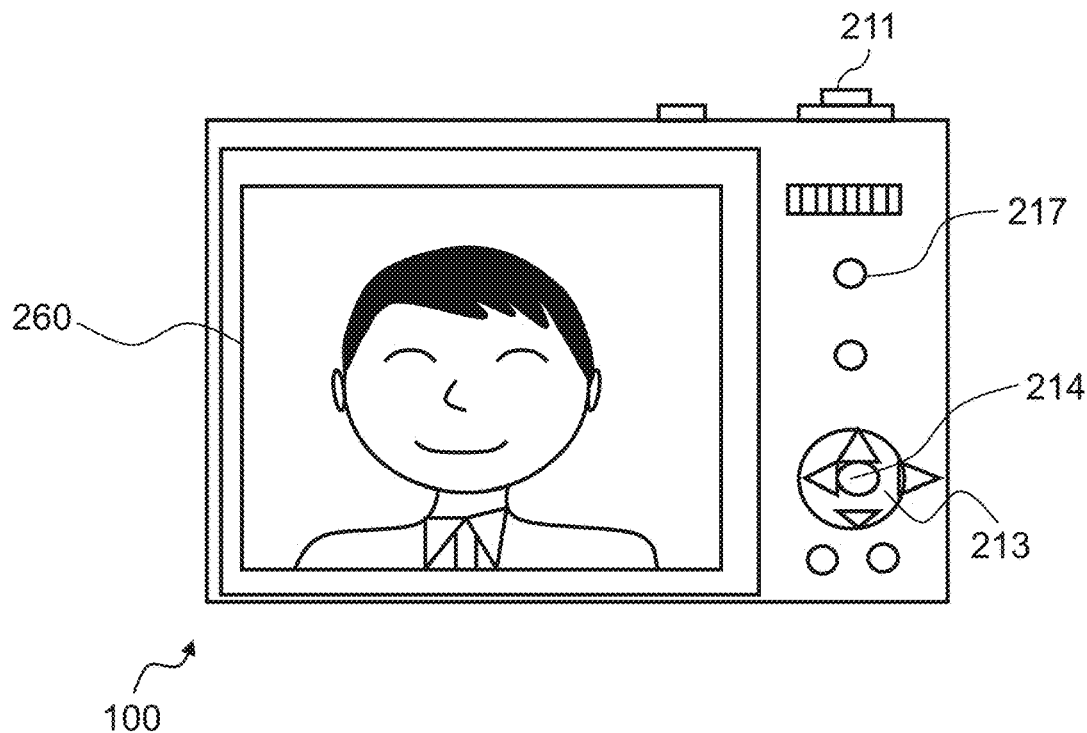
FIG. 2 is a view illustrating a back surface of the digital camera according to the first exemplary embodiment.

FIG. 2 is a view illustrating a back surface of digital camera 100. As illustrated in FIG. 2, operation member 250 includes, for example, release button 211, selection button 213, determination button 214, moving image recording button 217, and the like. Upon receipt of the user's operation, operation member 250 transmits various instruction signals to controller 210.

Release button 211 is a two-stage pressing type push button. When the user presses release button 211 halfway down, controller 210 executes, for example, autofocus control (AF control) and auto exposure control (AE control). When the user presses release button 211 fully down, controller 210 records an image captured at a timing of the pressing operation as a recorded image in, for example, memory card 230.

Selection button 213 includes up, down, left, and right push buttons. By pressing any one of up, down, left, and right push buttons of selection button 213, the user can move a cursor or select various condition items displayed on display monitor 260.

Determination button 214 is a push button. When the user presses determination button 214 while digital camera 100 is in a shooting mode or a playback mode, controller 210 displays a menu screen on display monitor 260. The menu screen is a screen for receiving various condition settings for shooting and playback. When determination button 214 is pressed with an item corresponding to one of the various condition settings selected, controller 210 enables the setting corresponding to the selected item.

[2. Operation of Digital Camera]

Operation modes of digital camera 100 according to the first exemplary embodiment include a still image recording mode, a moving image recording mode, and a playback mode. The still image recording mode is an operation mode for recording a still image. The moving image recording mode is an operation mode for recording a moving image. The playback mode is an operation mode for playing back a recorded image. Further, the still image recording mode and the moving image recording mode each include a plurality of security modes for protecting privacy of shot images.

[2.1 Security Mode]

Each of the security modes is a mode for protecting personal information included in shot images. The security mode is used to protect personal information when information is posted, particularly, for example, when an image is uploaded onto an SNS.

The first exemplary embodiment allows the user to select a desired security mode from the plurality of security modes before shooting a still image or a moving image. Each of the plurality of security modes has a unique combination of various detailed settings. The user adapts the detailed settings to respective desired conditions so as to set the desired security mode.

In the first exemplary embodiment, the detailed settings of the security mode include detailed settings 1 to 4. Detailed setting 1 is a setting of a subject to be subjected to the security-protection process (hereinafter referred to as a target subject). Detailed setting 2 is a setting of a target on which the security-protection process is executed (hereinafter referred to as a security-protection target). Detailed setting 3 is a setting of the security-protection process. Detailed setting 4 is a setting of a method for recording the processed image data on which the security-protection process has been executed and the unprocessed image data on which the security-protection process has not been executed.

The target subject to be set through detailed setting 1 includes, for example, a first target subject, a second target subject, and a third target subject. The first target subject includes all subjects having their respective faces recognized as faces by detector 190. The second target subject is a subject having a face that is unregistered for the personal authentication. The third target subject is a subject having a face that is registered for the personal authentication.

Figure 5:
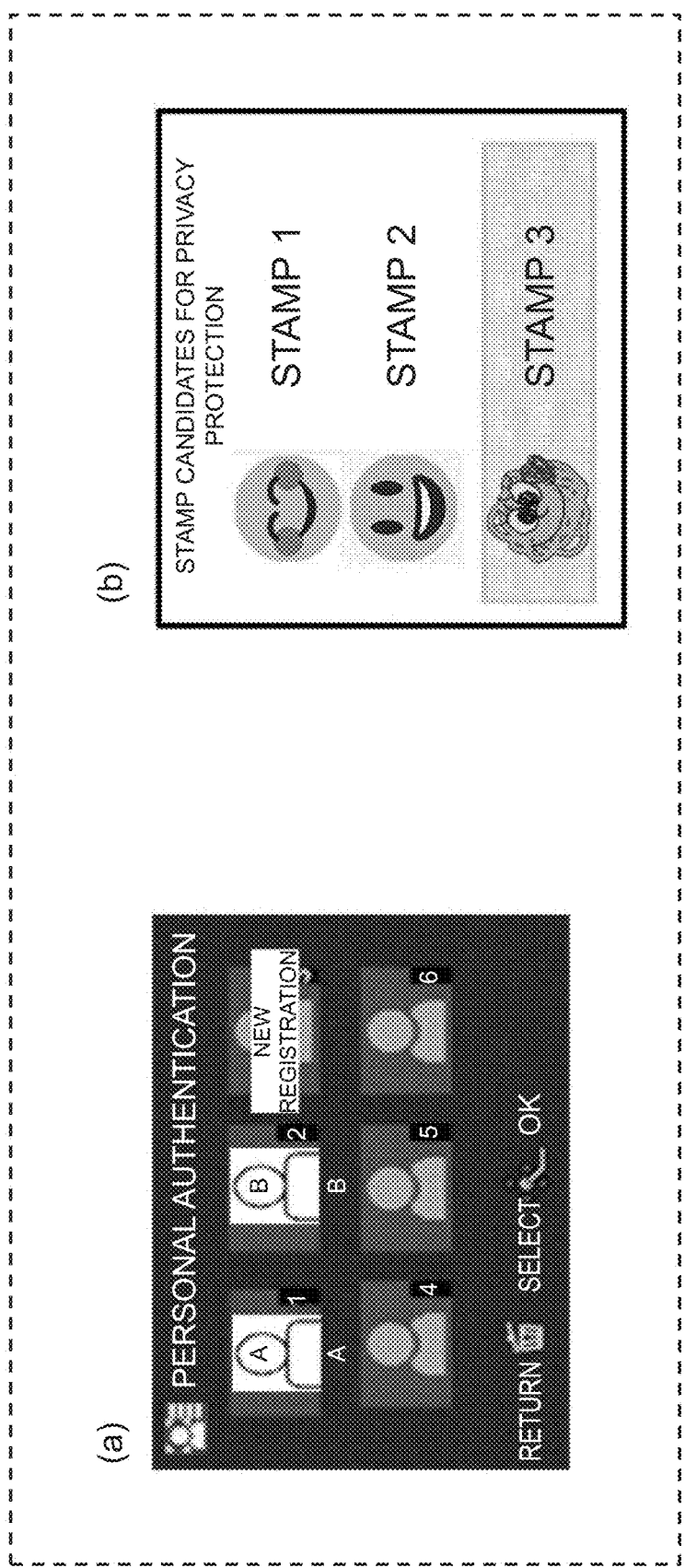
FIG. 5 is a diagram illustrating (a) a screen showing registration information for personal authentication and (b) a screen showing registered stamps, according to the first exemplary embodiment.

Note that the personal authentication corresponds to, for example, a process that allows controller 210 to identify a specific individual based on a comparison, made by detector 190, between face information and a face included in a shot image, provided that the face information is preregistered. Part (a) of FIG. 5 illustrates a screen showing registration information for the personal authentication. In the first exemplary embodiment, the user registers respective names of and pieces of face information on individuals A and B in memory card 230 before setting the security mode, as illustrated in part (a) of FIG. 5.

Furthermore, the security-protection target to be set through detailed setting 2 corresponds to identification information for identifying an individual. The security-protection target is, for example, at least one of a face, a fingerprint, a name tag (name), and the like.

Figure 3:
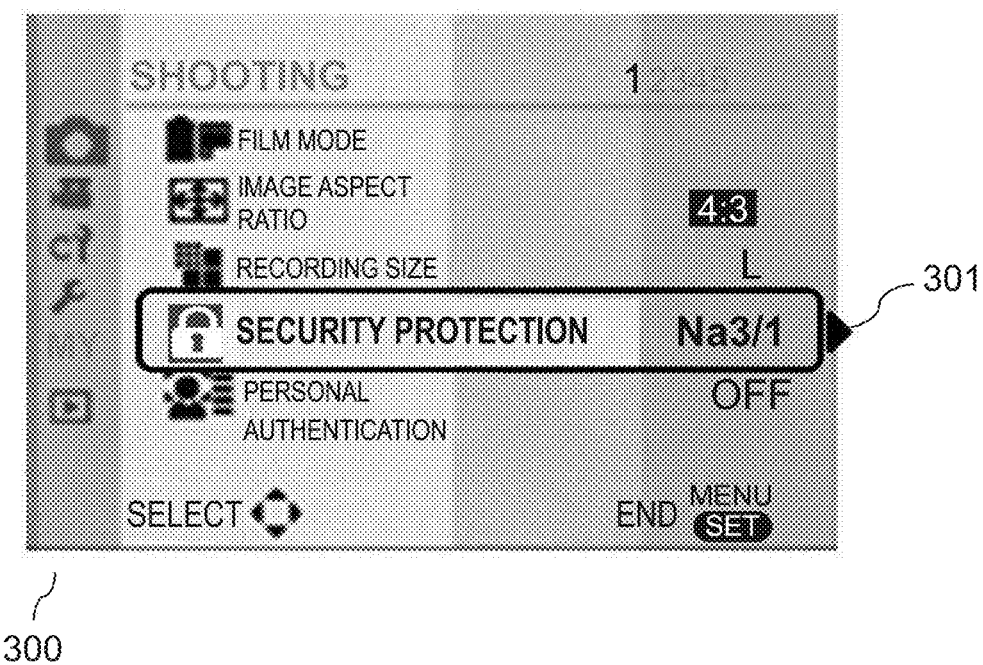
FIG. 3 is a diagram illustrating a setting menu screen in a still image shooting mode according to the first exemplary embodiment.

An operation for selecting the security mode, that is, an operation for configuring detailed settings 1 to 4 will be described below. FIG. 3 illustrates a screen showing setting menu 300 in the still image shooting mode. When the user selects "SECURITY PROTECTION" from setting menu 300, transition is made to a screen illustrated in FIG. 4 where the user can configure the detailed settings of the security mode.

Figure 4:
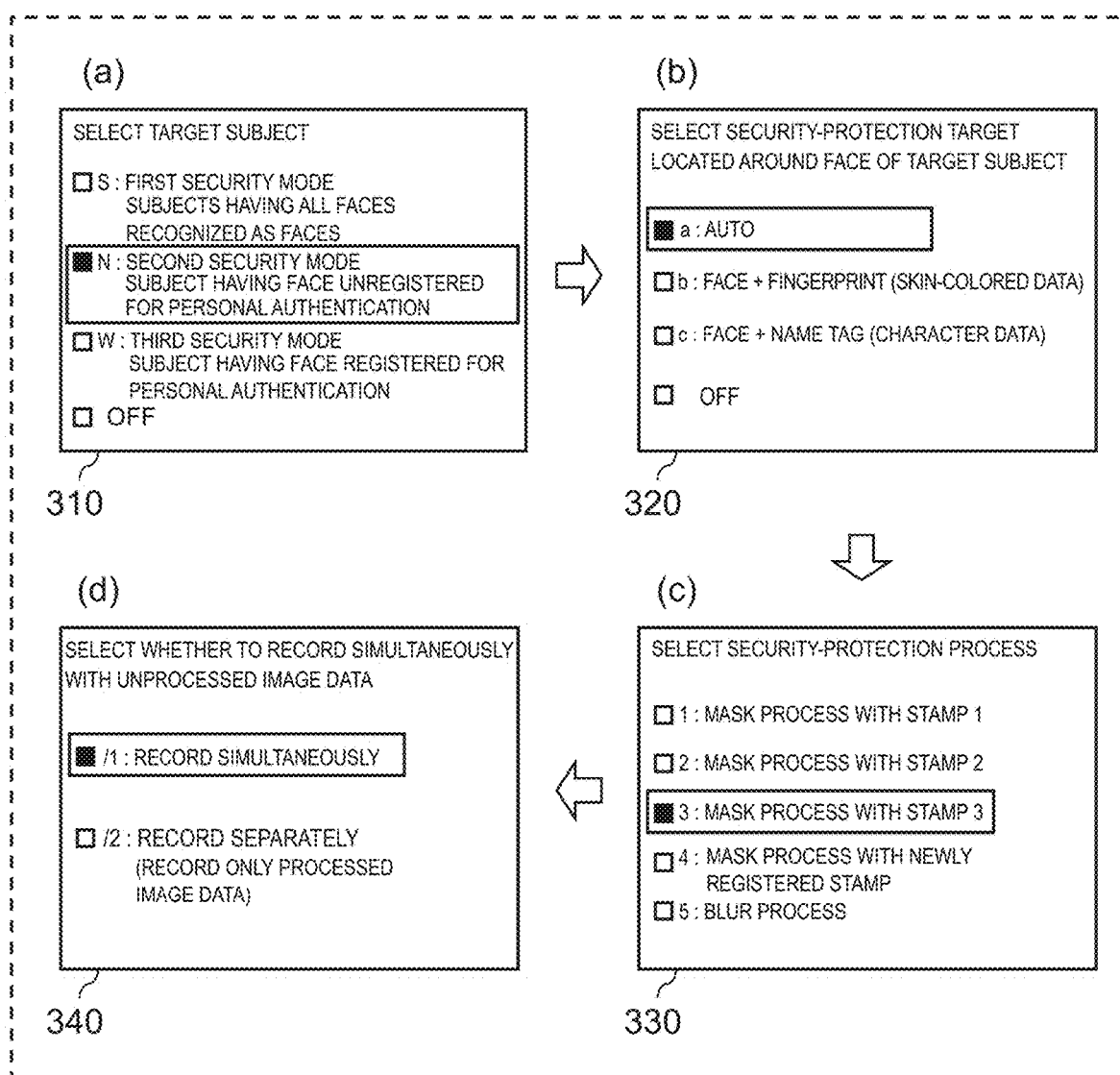
FIG. 4 is a diagram illustrating respective screens of detailed settings 1 to 4 of a security mode according to the first exemplary embodiment.

Herein, FIG. 3 illustrates a case where the security mode is set to "Na3/1" through detailed settings 1 to 4 of the security mode illustrated in FIG. 4. With reference to an example in which the user sets the security mode to "Na3/1", an operation for selecting the security mode will be described below.

First, with setting menu 300 illustrated in FIG. 3 displayed, the user uses selection button 213 to move a cursor to "SECURITY PROTECTION". The movement of the cursor to "SECURITY PROTECTION" causes right-pointing triangle 301 to appear on the screen. In this state, when the user presses the right push button of selection button 213, transition is made to screen 310 for detailed setting 1 of the security mode illustrated in part (a) of FIG. 4.

Screen 310 illustrated in part (a) of FIG. 4 allows the user to set a specific target subject of three target subjects S, N, W. Screen 310 illustrated in part (a) of FIG. 4 further allows the user to set the target subject to OFF. With the target subject set to OFF, the security-protection process is not executed.

Target subject S illustrated in part (a) of FIG. 4 corresponds to the first target subject described above that indicates all subjects having their respective faces recognized as faces. Target subject N corresponds to the second target subject described above that indicates a subject having a face that is unregistered for the personal authentication. Target subject W corresponds to the third target subject described above that indicates a subject having a face that is registered for the personal authentication.

Part (a) of FIG. 4 illustrates a case where the user uses determination button 214 to select target subject N. That is, the user has selected a subject having a face that is unregistered for the personal authentication as a target subject. For example, in a case where the user has registered individuals A and B for the personal authentication as illustrated in part (a) of FIG. 5, digital camera 100 determines that a subject having a face other than respective faces of individuals A and B is a target subject.

When target subject N is selected on screen 310 illustrated in part (a) of FIG. 4, a right-pointing triangle appears on screen 310 (not illustrated in part (a) of FIG. 4). In this state, when the user presses the right push button of selection button 213, transition is made to screen 320 for detailed setting 2 of the security mode illustrated in part (b) of FIG. 4.

Screen 320 illustrated in part (b) of FIG. 4 allows the user to select the security-protection target. For example, screen 320 illustrated in part (b) of FIG. 4 allows the user to select a desired security-protection target from three security-protection targets (that is, security-protection target a, security-protection target b, and security-protection target c).

Herein, in the first exemplary embodiment, security-protection targets a to c are preset as described below.

Security-protection target a includes a face, a fingerprint (skin-colored data), and a name tag (character data) of the target subject selected in part (a) of FIG. 4. Security-protection target b includes a face and a fingerprint (skin-colored data) of the target subject selected in part (a) of FIG. 4. Security-protection target c includes a face and a name tag (character data) of the target subject selected in part (a) of FIG. 4, the name tag being located around the chest of the target subject.

The example illustrated in part (b) of FIG. 4 indicates a case where the user uses determination button 214 to select security-protection target a. When any one of the security-protection targets is selected, a right-pointing triangle appears, and when the user presses the right push button of selection button 213, transition is made to screen 330 for detailed setting 3 of the security mode illustrated in part (c) of FIG. 4.

Screen 330 illustrated in part (c) of FIG. 4 allows the user to set the security-protection process. That is, screen 330 illustrated in part (c) of FIG. 4 receives selection indicating what kind of image processing to be executed on the security-protection target selected through detailed setting 2 of the target subject selected through detailed setting 1. Note that, in the first exemplary embodiment, the user selects, on screen 330 illustrated in part (c) of FIG. 4, image processing to be executed only on a security-protection target corresponding to a face rather than on all security-protection targets. Furthermore, execution of the blur process on the fingerprint and the name tag is predetermined.

Part (c) of FIG. 4 illustrates an example in which any one of security-protection processes 1 to 4, each corresponding to the mask process, and security-protection process 5 corresponding to the blur process can be selected as the security-protection process. Each of security-protection processes 1 to 3 corresponding to the mask process is a process for superimposing any one of stamps 1 to 3 illustrated in part (b) of FIG. 5 on the security-protection target or replacing the security-protection target with any one of stamps 1 to 3. Stamps 1 to 3 are stamps preregistered in digital camera 100. Security-protection process 4 corresponding to the mask process is a process for superimposing a stamp that is newly registered on the security-protection target or replacing the security-protection target with the stamp. Such a new stamp is available to the user through, for example, the Internet. Security-protection process 5 corresponding to the blur process includes a resizing process and the like.

The example illustrated in part (c) of FIG. 4 indicates screen 330 on which the user uses determination button 214 to select security-protection process 3. When the user selects any one of the security-protection processes, a right-pointing triangle appears, and when the user presses the right push button of selection button 213, transition is made to screen 340 for detailed setting 4 of the security mode illustrated in part (d) of FIG. 4.

Screen 340 illustrated in part (d) of FIG. 4 allows the user to set whether the unprocessed image data is simultaneously recorded together with the processed image data in memory card 230. In part (d) of FIG. 4, "/1" denotes simultaneous recording, and "/2" denotes separate recording. The example illustrated in part (d) of FIG. 4 indicates a case where the user uses determination button 214 to select setting "/1" corresponding to the simultaneous recording. Note that "simultaneous recording" means "recording as a series of operations" rather than recording in memory card 230 at exactly the same timing. That is, "the unprocessed image data is simultaneously recorded together with the processed image data" means "when the processed image data is recorded, the unprocessed image data is also recorded".

In a case where both the security-protection target and the security-protection process are fixedly determined in digital camera 100, it may fail to adapt to user's preferences or user's thoughts, which may in turn impair user convenience. Therefore, digital camera 100 according to the first exemplary embodiment is configured to allow the user to select a desired security mode from the plurality of security modes before shooting. To be more specific, digital camera 100 is configured to allow the user to select at least one of the security-protection target and the security-protection process.

As described above, digital camera 100 according to the first exemplary embodiment is capable of individually adapting to user's requirements on security protection, thereby improving convenience. Digital camera 100 according to the first exemplary embodiment is further configured to allow the user to select a target subject. This configuration further improves user convenience.

Digital camera 100 according to the first exemplary embodiment is further configured to allow the user to select a method for recording the unprocessed image data. This configuration improves user convenience.

In the example illustrated in FIG. 4, security mode setting unit 200 is capable of setting the security mode to, for example, "Na3/1", and the user can confirm the setting on the screen illustrated in FIG. 3.

[2.2 Still Image Recording Operation]

Figure 6A:
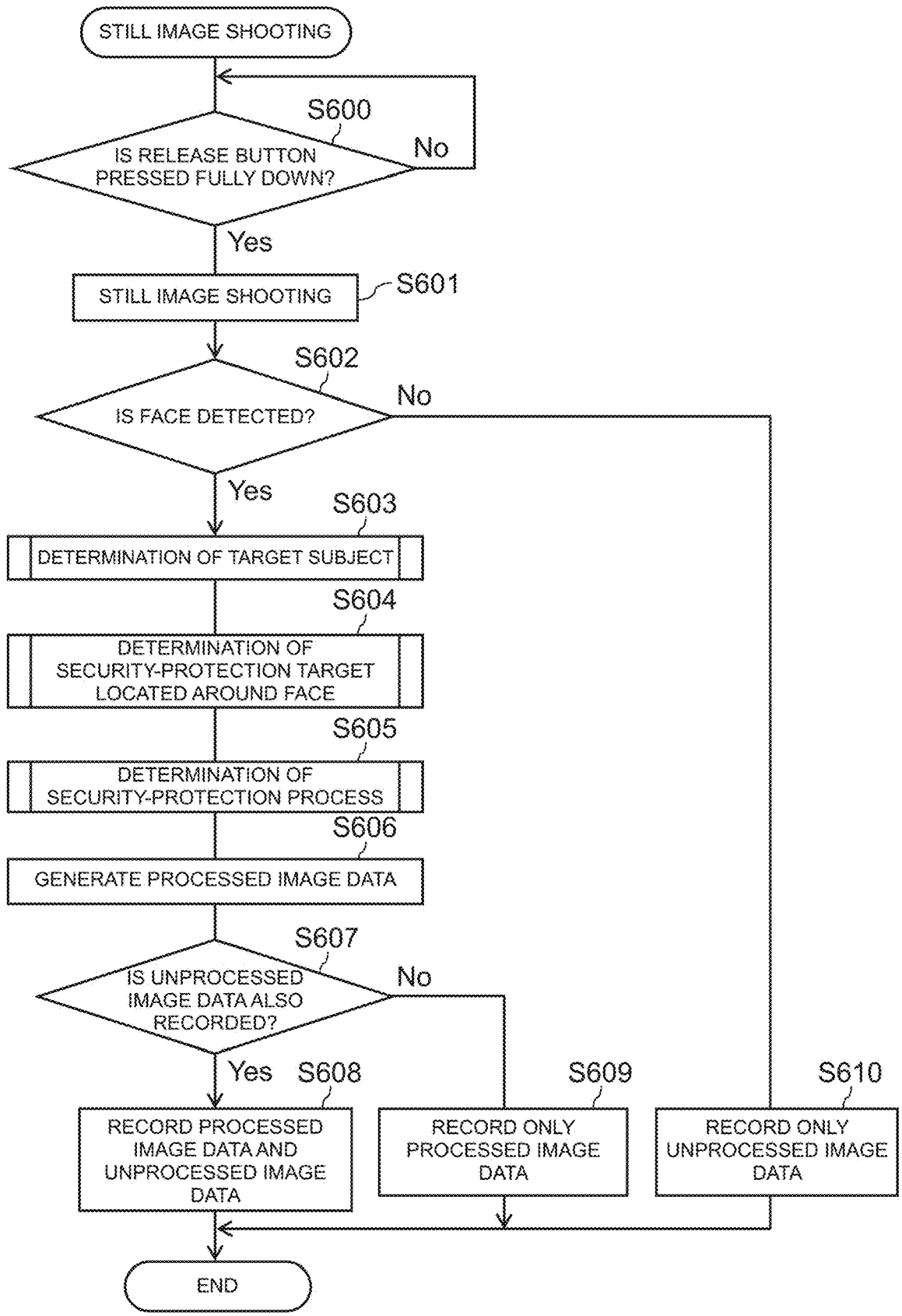
FIG. 6A is a flowchart illustrating a still image recording operation of the digital camera according to the first exemplary embodiment.

The still image recording mode for recording a still image will be described below. FIG. 6A is a flowchart illustrating the still image recording operation of digital camera 100.

When the user turns on digital camera 100, digital camera 100 displays, on display monitor 260, a subject image that is formed, by optical system 110, in CMOS imaging sensor 150 and passes via image processor 170 and controller 210. At this time, a through image that is the subject image displayed on display monitor 260 is a moving image formed by sequentially displaying image data acquired from CMOS imaging sensor 150.

In digital camera 100, when the user presses release button 211 halfway down, controller 210 executes a contrast AF process such that a contrast value of the subject image acquired from image processor 170 is equal to the maximum contrast value. To be more specific, the contrast AF process is a process for moving the focusing lens.

Next, controller 210 determines whether the user presses release button 211 fully down (S600). In a case where release button 211 is not pressed fully down (No in step S600), controller 210 returns to step S600. In a case where release button 211 is pressed fully down (Yes in step S600), controller 210 proceeds to step S601.

Figure 8:
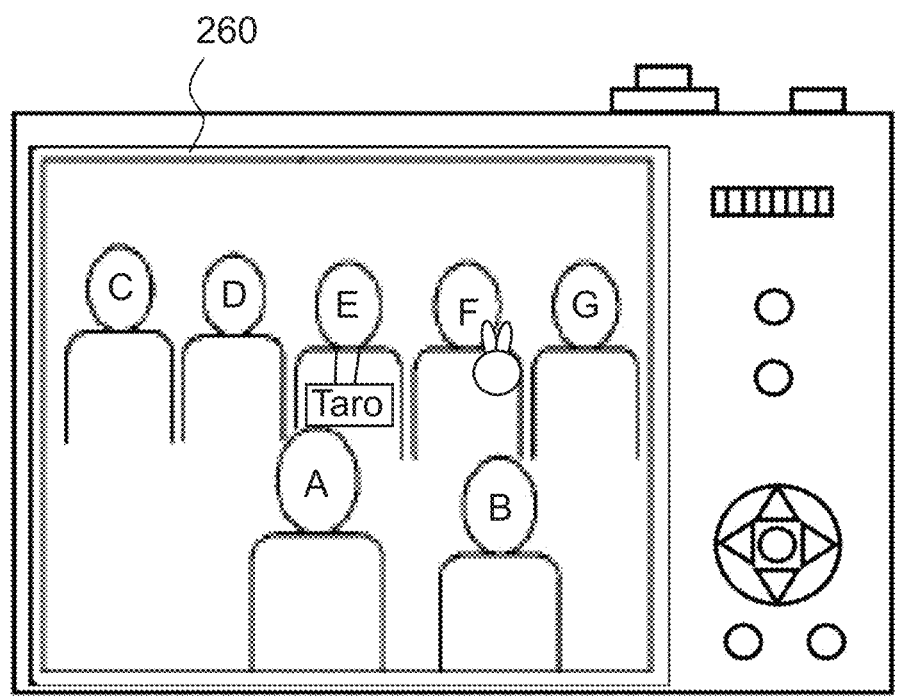
FIG. 8 is a diagram illustrating a display monitor displaying a group photograph on which a security-protection process has not been executed, according to the first exemplary embodiment.

In step S601, controller 210 controls optical system 110, CMOS imaging sensor 150, and image processor 170 for a capturing operation, captures a still image, and stores still image data in buffer 180. The captured still image is displayed on display monitor 260 as illustrated in FIG. 8.

Next, in step S602, detector 190 uses the face recognition technique to detect a face of the subject within the image data processed by image processor 170. In a case where detector 190 fails to detect a face (No in step S602), controller 210 proceeds to step S610.

In step S610, controller 210 records, in memory card 230, image data captured at a timing of the pressing operation as the unprocessed image data without executing the security-protection process.

In step S602, in a case where detector 190 detects a face (Yes in step S602), controller 210 proceeds to step S603. Note that, in the first exemplary embodiment, respective faces of subjects A to G are detected as faces in step S602, as illustrated in FIG. 8.

Figure 7:
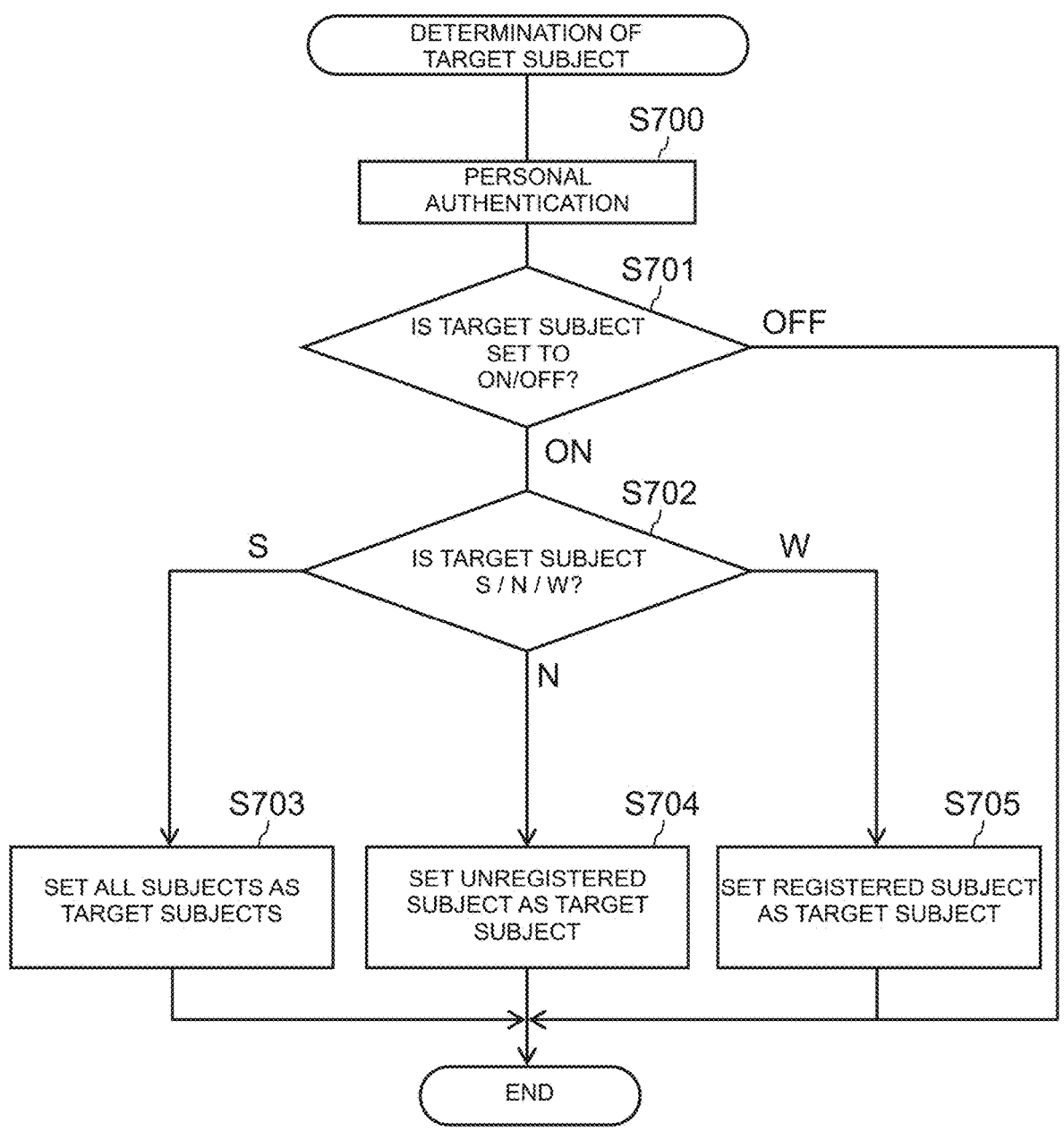
FIG. 7 is a flowchart illustrating a process for determining a target subject according to the first exemplary embodiment.

In step S603, controller 210 determines a target subject. FIG. 7 illustrates the details of step S603. FIG. 7 is a flowchart illustrating a process for determining the target subject. In step S700, detector 190 executes personal authentication on, for example, faces detected within the still image illustrated in FIG. 8. To be more specific, detector 190 determines whether each of the faces detected within the still image is identical to a face corresponding to face information registered in the registration information.

In the first exemplary embodiment, as illustrated in part (a) of FIG. 5, subjects A and B are registered for the personal authentication, for example. In this case, detector 190 recognizes respective pieces of face information on subjects A, B illustrated in FIG. 8 as information registered for the personal authentication and recognizes respective pieces of face information on subjects C to G as information unregistered for the personal authentication.

Next, in step S701, controller 210 determines whether the user presets the target subject to ON or OFF. In the first exemplary embodiment, the user presets the target subject as illustrated in part (a) of FIG. 4 (ON in step S701), which makes transition to next step S702.

In step S702, controller 210 determines which of target subject S, target subject N, and target subject W corresponds to the preset target subject. In a case where the target subject S is set, controller 210 proceeds to step S703. In step S703, detector 190 determines that all subjects having respective faces recognized as faces are target subjects. In this case, even without preregistration of face information for the personal authentication, upon shooting, detector 190 determines that all subjects are target subjects, which makes it possible to generate image data in consideration of personal information protection.

In step S702, in a case where controller 210 determines that target subject N is set, controller 210 proceeds to step S704. In step S704, a subject unregistered for the personal authentication is determined to be a target subject. In this case, for example, when shooting is performed with a face of the user, a face of a user's child, and the like preset for the personal authentication, controller 210 determines that individuals other than the user and the user's child recognized by detector 190 based on face recognition are target subjects. This configuration allows image data to be generated in consideration of privacy of individuals other than the user and the user's child.

In step S702, in a case where controller 210 determines that target subject W is set, controller 210 proceeds to step S705. In step S705, determination is made that only a subject registered in the registration information is a target subject. In this case, for example, when shooting is performed with the face of the user's child, and the like preset for the personal authentication, controller 210 determines that a child detected by detector 190 is a target subject. This configuration allows image data to be generated in consideration of privacy of children. In the first exemplary embodiment, as illustrated in part (a) of FIG. 4, target subject N is preset, which causes unregistered subjects (subjects C to G in FIG. 8) to become target subjects. Consequently, the target subject is determined.

Figure 9:
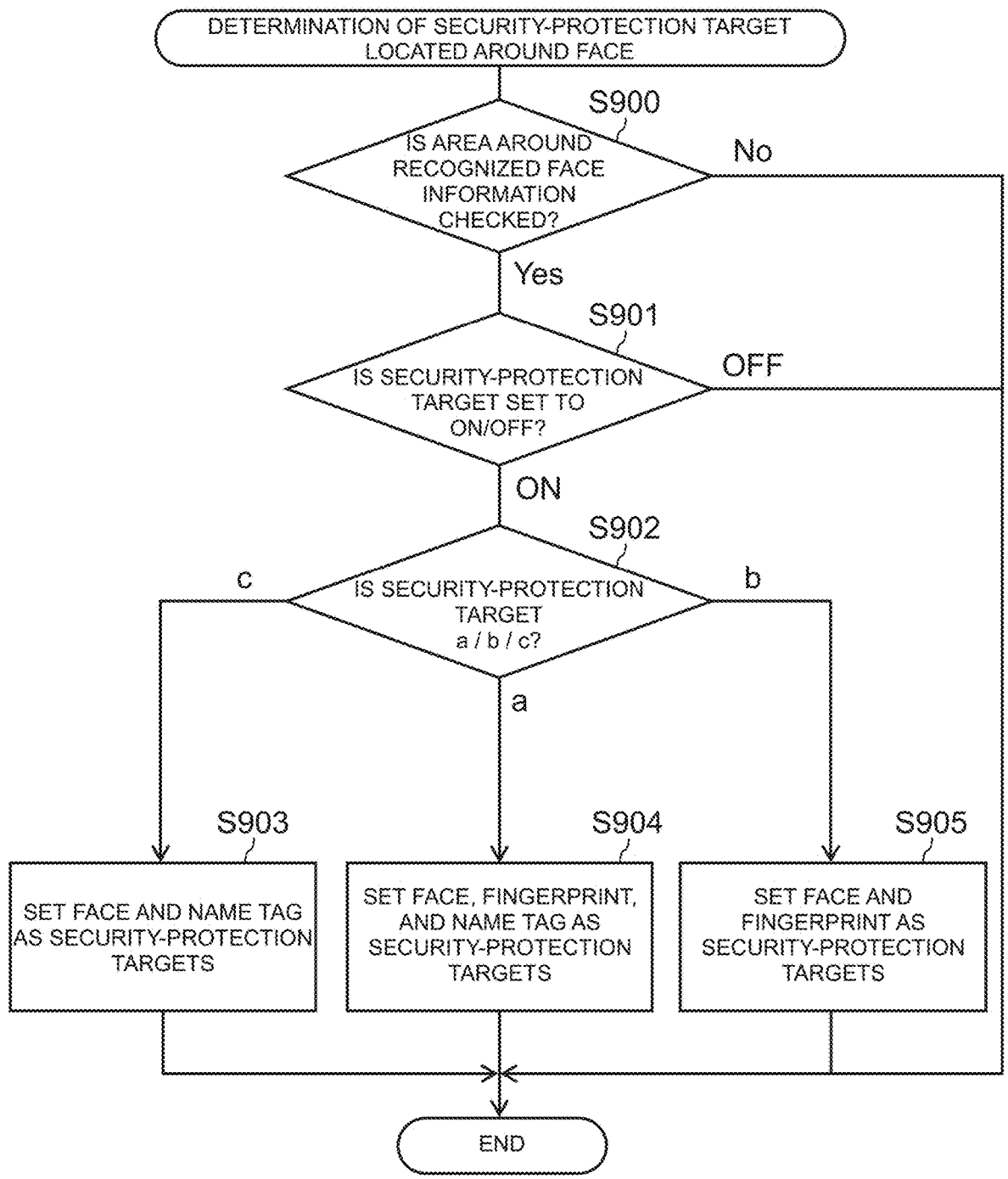
FIG. 9 is a flowchart illustrating a process for determining a security-protection target according to the first exemplary embodiment.

After the target subject is determined, transition is made to step S604 illustrated in FIG. 6A. In step S604, the security-protection target located around the face of the target subject is determined. FIG. 9 illustrates the details of step S604. FIG. 9 is a flowchart illustrating a process for determining the security-protection target. In step S900, controller 210 determines whether an area around face information recognized by detector 190 has been checked. To be more specific, detector 190 determines whether at least one of skin-colored data and character data located around the recognized face information has been detected. Such skin-colored data includes a fingerprint. Such character data includes a name tag. In a case where neither of the skin-colored data nor the character data is detected (No in step S900), the process for determining the security-protection target is terminated. That is, the process in step S604 illustrated in FIG. 6A is terminated, and transition is made to step S605.

On the other hand, in a case where at least one of the skin-colored data and the character data is detected in step S900 illustrated in FIG. 9 (Yes in step S900), transition is made to step S901.

In step S901, controller 210 determines whether the security mode setting unit 200 presets the setting of the security-protection target to ON or OFF in accordance with a user's instruction. In a case where the setting of the security-protection target is set to OFF (OFF in step S901), the process for determining the security-protection target is terminated, and transition is made to step S605. On the other hand, in the first exemplary embodiment, as illustrated in part (b) of FIG. 4, the setting of the security-protection target is preset (ON in step S901), which makes transition to next step S902.

In step S902, controller 210 determines which of security-protection targets a, b, c corresponds to the preset security-protection target.

In step S902, in a case where determination is made that security-protection target c is set, transition is made to step S903. In step S903, controller 210 determines that a face of the target subject and a character located around the face of the target subject, such as a character located around a chest of the target subject, are the security-protection targets. That is, controller 210 associates the face of the subject recognized as a face and a name tag (name) located around the chest lower than a neck with each other and sets the face and the name tag as the security-protection targets.

On the other hand, in step S902, in a case where determination is made that target subject a is set, transition is made to step S904. In step S904, determination is made that the face, skin-colored data around the face, and the character data located around the chest are the security-protection targets. Therefore, controller 210 associates the face of the subject recognized as a face, the name tag (name) located around the chest lower than the neck, and a fingerprint portion of a V-sign or a palm around the face with each other, and sets the face, the name tag, and the fingerprint as the security-protection targets.

Further, in step S902, in a case where determination is made that security-protection target b is set, transition is made to step S905. In step S905, determination is made that the face and the skin-colored data around the face are the security-protection targets. Therefore, controller 210 associates the face of the subject recognized as a face and the fingerprint portion of the V-sign or the palm around the face information with each other and sets the face and the fingerprint as the security-protection targets. Then, the flow for determining the security-protection target ends.

Figure 10:
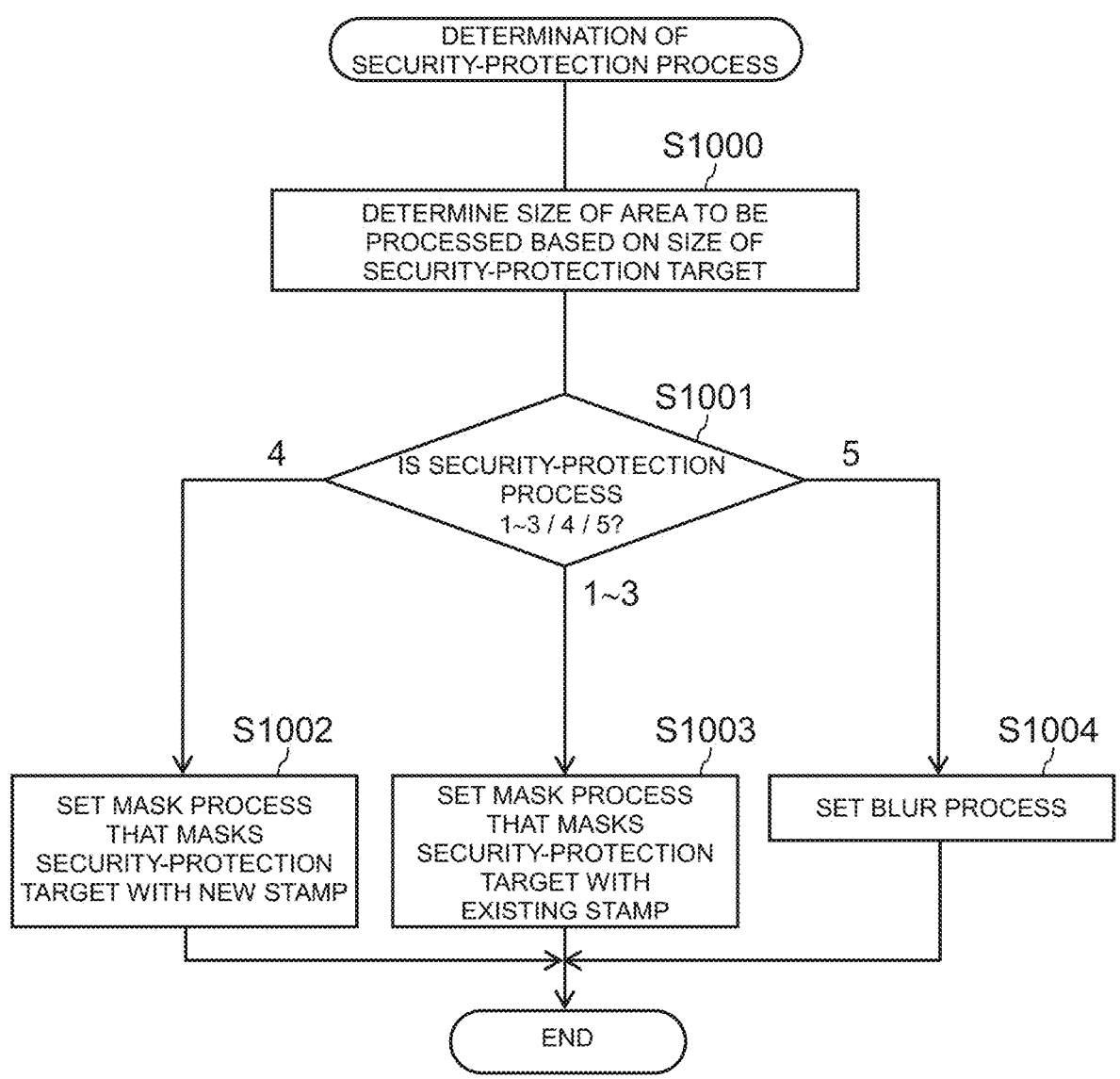
FIG. 10 is a flowchart illustrating a process for determining the security-protection process according to the first exemplary embodiment.

When the security-protection target is determined, transition is made to step S605 illustrated in FIG. 6A. In step S605, the security-protection process is determined. FIG. 10 illustrates the details of step S605. FIG. 10 is a flowchart illustrating a process for determining the security-protection process. FIG. 10 illustrates a case where the security-protection target is a face.

In step S1000 illustrated in FIG. 10, detector 190 determines a size of an area to be processed, according to a size of the detected security-protection target. This configuration eliminates the need for preregistration of a plurality of types of stamp data with different sizes for the mask process. This configuration further eliminates the need for manual setting of sizes of stamps for each security-protection target.

Next, in step S1001, controller 210 determines, for example, which of the security-protection processes 1 to 3, 4, 5 illustrated in part (c) of FIG. 4 corresponds to the preset security-protection process.

In step S1001, in a case where determination is made that security-protection process 4 is set, transition is made to step S1002. In step S1002, determination is made that the security-protection process is the mask process in which a new stamp is superimposed on the security-protection target or the security-protection target is replaced with the new stamp.

On the other hand, in step S1001, in a case where determination is made that any one of security-protection processes 1 to 3 is set, transition is made to step S1003. In step S1003, determination is made that the security-protection process is the mask process in which an existing stamp is superimposed on a face that is the security-protection target or the face is replaced with the existing stamp.

Further, in step S1001, in a case where determination is made that security-protection process 5 is set, transition is made to step S1004. In step S1004, determination is made that the security-protection process is the blur process in which the security-protection target is blurred.

In the first exemplary embodiment, as illustrated in part (c) of FIG. 4, security-protection process 3 is preset. Therefore, a mask process in which stamp 3 illustrated in part (b) of FIG. 5 is superimposed on the security-protection target is set as the security-protection process. Alternatively, a mask process in which the security-protection target is replaced with stamp 3 is set as the security-protection process. Consequently, the security-protection process is determined.

When the security-protection process is determined, transition is made to step S606 illustrated in FIG. 6A. In step S606, image processor 170 generates processed image data by adding security-protection processed information to the image data generated by CMOS imaging sensor 150, in accordance with the target subject determined in step S603, the security-protection target determined in step S604, and the security-protection process determined in step S605.

Figure 11:
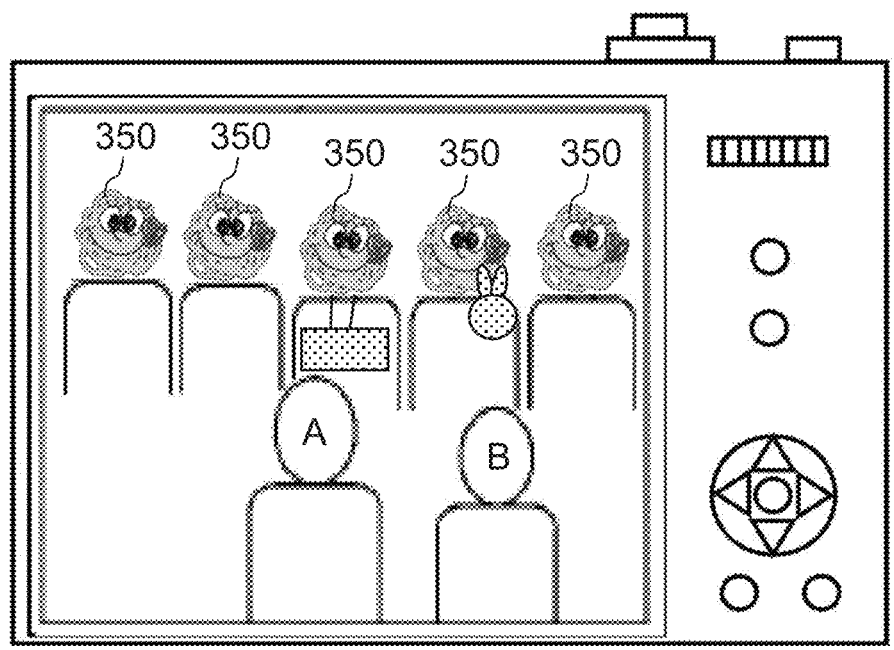
FIG. 11 is a diagram illustrating the display monitor displaying a group photograph on which a mask process has been executed, according to the first exemplary embodiment.

For example, in a case where the respective faces of subjects C to G illustrated in FIG. 8 are set as the security-protection targets, and the security-protection process is set in which the faces are subjected to the mask process using stamp 3 illustrated in part (b) of FIG. 5 and the fingerprints and the name tag are subjected to the blur process, such processed image data as illustrated in FIG. 11 is generated. That is, the processed image data is formed of the image data and the security-protection processed information (in this example, masks 350 and data generated by the blur process) added to the image data. Accordingly, the user can record irreversibly processed image data. Then, the user can obtain image data in which personal information is protected. Further, controller 210 can distinguish between the processed image data and image data on which the security-protection process has not been executed, regardless of the type of the security-protection process, such as the mask process or the blur process.

Next, in step S607, controller 210 determines whether the unprocessed image data is simultaneously recorded together with the processed image data based on preset detailed setting 4. For example, in a case where the user makes a setting in advance such that the security-protection processed image data and the unprocessed image data are simultaneously recorded, determination is made in step S607 that simultaneous recording is executed (Yes in step S607), and transition is made to step S608.

In step S608, the processed image data and the unprocessed image data are simultaneously recorded into memory card 230. In a case where the processed image data and the unprocessed image data are simultaneously recorded, an image to be printed or an image to be viewed with a personal album owned by the user, on which the security-protection process has not been executed, can be obtained other than the image to be uploaded.

On the other hand, in a case where determination is made in step S607 that simultaneous recording is not executed (No in step S607), transition is made to step S609. In step S609, only the processed image data is recorded into memory card 230.

Then, the still image recording operation according to the first exemplary embodiment ends. As described above, the user can shoot images in consideration of personal information on a desired subject, even without attention to the security-protection target. Alternatively, the user can shoot images in consideration of personal information on a desired subject, even without manual determination of a location of the security-protection target.

As a result, the user can focus on shooting.

[2.3 Upload Operation]

Figure 12A:
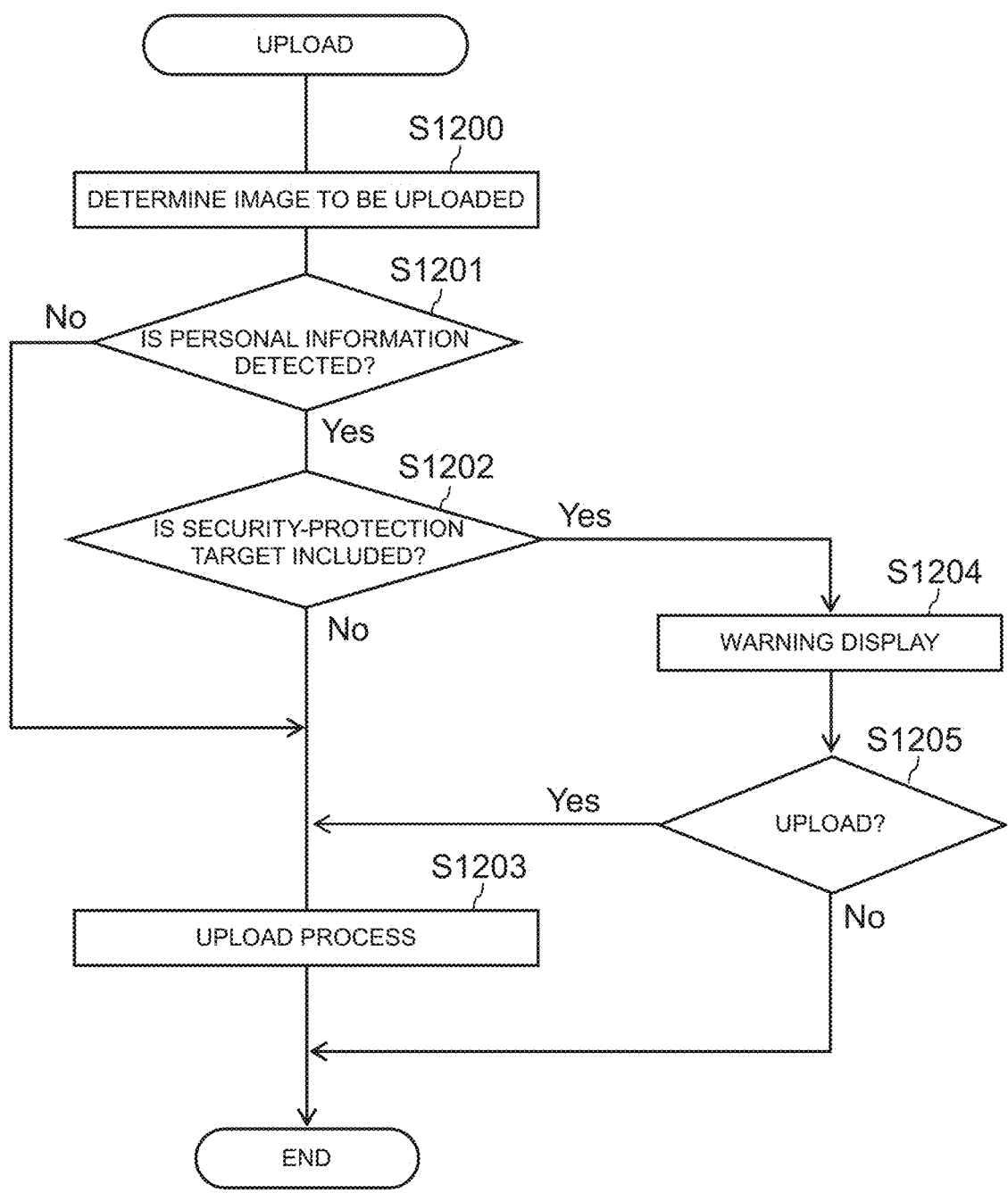
FIG. 12A is a flowchart illustrating an upload process according to the first exemplary embodiment.

An operation for uploading a still image recorded in the still image recording mode will be described below. FIG. 12A is a flowchart illustrating an upload process.

First, in step S1200, the user checks display monitor 260 to determine a still image to be uploaded. To be more specific, as illustrated in part (a) of FIG. 13, a message asking the user whether to upload the displayed still image appears on a screen at the time of upload. In a case where the user desires to upload the displayed still image, the user presses determination button 214 to select "YES". Accordingly, the image the user desires to upload is determined.

Subsequently, in step S1201, detector 190 detects personal information such as a face, a fingerprint, or a name of a subject within image data recorded in memory card 230.

In step S1201, in a case where the personal information is not detected (No in step S1201), transition is made to step S1203 in which controller 210 causes data transfer unit 270 to execute the upload process.

On the other hand, in step S1201, in a case where the personal information is detected (Yes in step S1201), transition is made to next step S1202.

In step S1202, controller 210 determines whether the still image to be uploaded includes the security-protection target based on information set by security mode setting unit 200. Specifically, in a case where the security mode that has been set corresponds to a mode in which a face of a subject, and a fingerprint and a name tag located around the face that are unregistered for the personal authentication are set as the security-protection targets, determination is made as to whether the still image to be uploaded includes the security-protection target on which the security-protection process has yet to be executed.

In step S1202, in a case where determination is made that no security-protection target is included (No in step S1202), transition is made to step S1203. In step S1203, controller 210 causes data transfer unit 270 to execute the upload process on the still image.

On the other hand, in step S1202, in a case where controller 210 determines that the still image to be uploaded includes the security-protection target, controller 210 causes display monitor 260 to display a warning display in step S1204.

Figure 13:
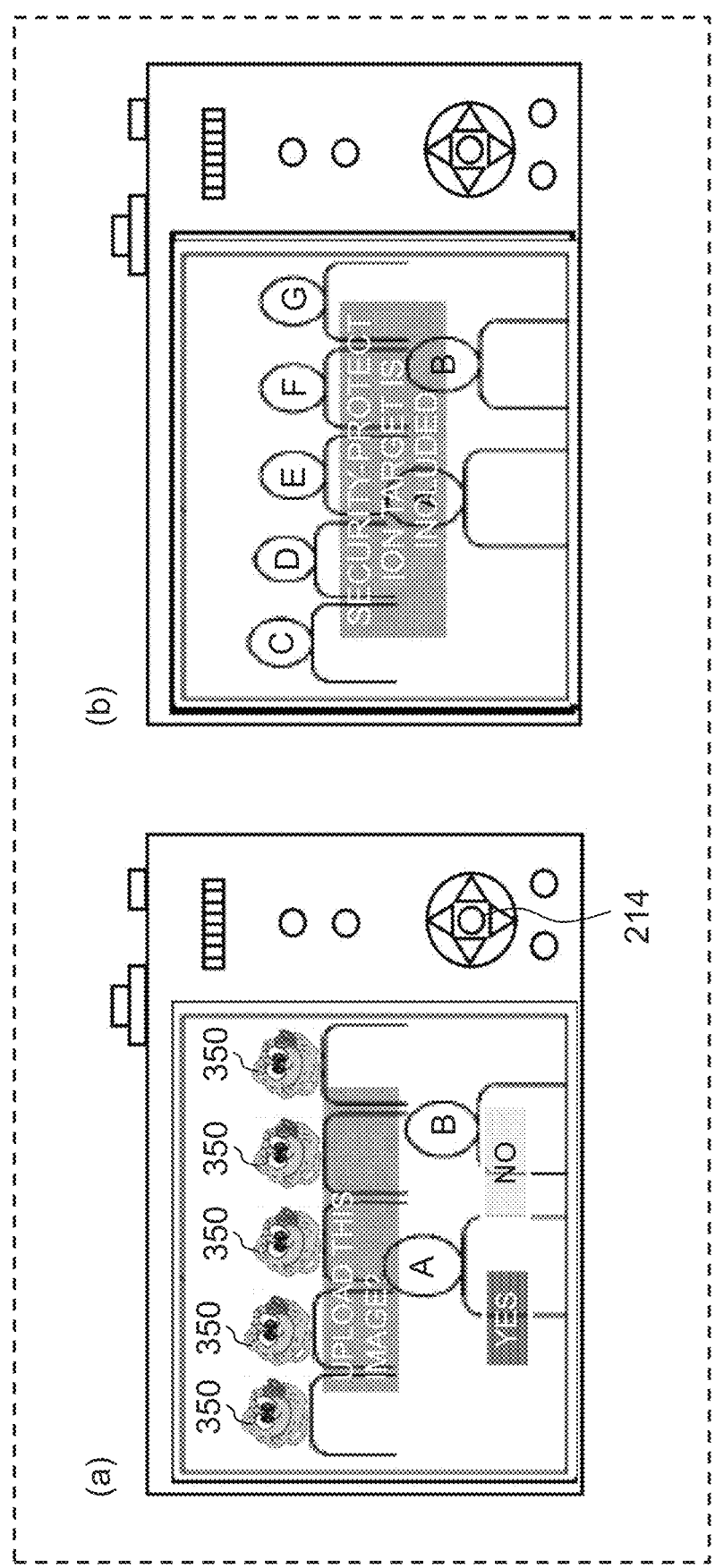
FIG. 13 is a diagram illustrating (a) a screen at the time of upload and (b) a warning message, according to the first exemplary embodiment.

If, as illustrated in part (b) of FIG. 13, respective pieces of face data of all the subjects A to G are set as the security-protection targets and the security-protection process has yet to be executed on respective faces of subjects A, B, controller 210 may determine that the still image to be uploaded includes the security-protection target. Therefore, controller 210 causes display monitor 260 to display warning message as illustrated in part (b) of FIG. 13. Accordingly, the user is warned about protection of personal information before uploading the unprocessed image data onto, for example, an SNS. The user can check a warning screen and select whether to upload the unprocessed image data or not (S1205).

In step S1205, in a case where the user determines to upload the unprocessed image data (Yes in S1205), transition is made to step S1203 in which the upload process is executed. On the other hand, in step S1205, in a case where the user determines not to upload the unprocessed image data (No in S1205), the process is terminated without uploading the unprocessed image data.

In the upload operation according to the first exemplary embodiment, when uploading image data that is not shot with digital camera 100 capable of executing the security-protection process (that is, the unprocessed image data), or image data that is shot with digital camera 100 with the security mode set to OFF (that is, the unprocessed image data), the user can recognize whether the image data includes the security-protection target.

This configuration prevents the user from accidentally uploading, onto, for example, an SNS, still images that have not been subjected to any protective measure for personal information.

[3. Summary]

As described above, the imaging apparatus (digital camera 100) according to the first exemplary embodiment includes a setting unit (security mode setting unit 200), an imaging unit (CMOS imaging sensor 150), a detector (detector 190), an image processor (image processor 170), and a controller (controller 210). Security mode setting unit 200 selects a specific security mode from a plurality of security modes, each of the plurality of security modes having a unique combination of a security-protection target and a security-protection process. CMOS imaging sensor 150 generates first image data (unprocessed image data) from optical information. Detector 190 detects a security-protection target based on the unprocessed image data. Image processor 170 executes a security-protection process on the security-protection target detected by detector 190 to generate second image data (processed image data). Controller 210 causes detector 190 to detect the security-protection target in accordance with the selected security mode. Controller 210 further causes image processor 170 to execute the security-protection process.

This configuration allows a user to spread, onto an SNS or the like with a sense of security, a shot image including protected personal information in accordance with the security mode that is set based on user's preferences.

Furthermore, in the imaging apparatus according to first exemplary embodiment, security mode setting unit 200 is configured to select the security mode before shooting. This configuration allows the shot image including protected personal information to be automatically recorded. As a result, a burden, on the user, of executing the security-protection process after shooting can be reduced.

Furthermore, in digital camera 100 according to the first exemplary embodiment, controller 210 causes image processor 170 to simultaneously generate the first image data (unprocessed image data) and the second image data (processed image data). Furthermore, controller 210 records the first image data (unprocessed image data) and the second image data (processed image data) simultaneously in memory card 230. This configuration allows the user to view the shot image based on the unprocessed image data as necessary. That is, digital camera 100 is capable of capturing unprocessed image data other than image data to be uploaded, as a photograph to be printed for user's personal use or a photograph to be viewed with a personal album owned by the user.

Furthermore, in the imaging apparatus according to the first exemplary embodiment, the security-protection target includes a face and identification information, other than the face, for identifying an individual. The identification information, other than a face, for identifying an individual includes at least one of a name (name tag) and a fingerprint. In the imaging apparatus according to the first exemplary embodiment, the security-protection process to be executed on the face and the security-protection process to be executed on the identification information other than the face may be identical to or different from each other. For example, the face may be subjected to the mask process, and at least one of the name and the fingerprint may be subjected to the blur process. This configuration improves user convenience.

Furthermore, the security-protection process according to the first exemplary embodiment is at least one of the blur process, the pixelation process, and the mask process. This configuration makes it possible to protect personal information included in a shot image from being clearly recognized by others.

Digital camera 100 according to the first exemplary embodiment further includes data transfer unit 270 configured to upload image data including the processed image data. This configuration allows the user to easily upload a shot image.

Second Exemplary Embodiment

Digital camera 100 according to the second exemplary embodiment is different from digital camera 100 according to the first exemplary embodiment in that digital camera 100 according to the second exemplary embodiment receives selection of the security mode after shooting. Furthermore, digital camera 100 according to the second exemplary embodiment is different from digital camera 100 according to the first exemplary embodiment in that digital camera 100 according to the second exemplary embodiment is capable of executing the security-protection process on image data after shooting, regardless of whether the image data is generated by digital camera 100 or not. "After shooting" corresponds to a time when the playback mode is set.

To be more specific, in the second exemplary embodiment, the user can, as in the first exemplary embodiment, set the security mode through the detailed settings of the security mode displayed on the display monitor (see FIG. 4).

It should be noted that, in the second exemplary embodiment, the security-protection process is executed after shooting rather than at the time of shooting, which is different from the first exemplary embodiment. Therefore, in the second exemplary embodiment, the timing of setting the security mode is not limited to a time before shooting, but may be a time before uploading. Note that a configuration of digital camera 100 according to the second exemplary embodiment is identical to the configuration of digital camera 100 according to the first exemplary embodiment; thus, description of the configuration will be omitted.

A still image playback operation of digital camera 100 according to the second exemplary embodiment will be described below with reference to FIG. 6B. In a flow illustrated in FIG. 6B, steps identical to the steps illustrated in FIG. 6A according to the first exemplary embodiment are given the same numbers. Note that in a case where the user sets the digital camera to the playback mode, the user can set the security mode before or after setting the digital camera to the playback mode. A method for setting the security mode is identical to the method according to the first exemplary embodiment illustrated in FIG. 4.

In the second exemplary embodiment, with the security mode preset, the user sets digital camera 100 to the playback mode. In the playback mode, an image recorded in memory card 230 is displayed on display monitor 260. The image may be an image shot with digital camera 100 or an image shot with a different imaging apparatus. The user uses operation member 250 to select an image (for example, a still image) on which the user desires to execute image processing (S611).

Subsequently, controller 210 determines whether detector 190 detects a face within the selected still image (S602). In a case where detector 190 detects no face (No in S602), controller 210 terminates the process.

On the other hand, in step S602, in a case where determination is made that detector 190 detects a face (Yes in S602), controller 210 proceeds to step S603 and determines a target subject within the selected still image in accordance with the security mode that has been set. For example, controller 210 causes detector 190 to detect a subject whose face information is registered for the personal authentication to set the subject as the target subject.

Next, controller 210 proceeds to step S604 and determines a security-protection target located around the face in the selected still image. For example, controller 210 causes detector 190 to detect the face and the name tag of the target subject and sets the face and the name tag as the security-protection targets.

Next, controller 210 determines a security-protection process in accordance with the set security mode (S605). For example, controller 210 sets the mask process as a security-protection process on the face. Furthermore, controller 210 sets the blur process as a security-protection process on the name tag.

Subsequently, controller 210 executes the security-protection process that has been set on the security-protection targets that have been set within the image data of the selected still image (S606). That is, controller 210 causes image processor 170 to generate the processed image data.

Finally, controller 210 records the processed image data into memory card 230 (S612).

An operation for uploading the still image on which the security-protection process has been executed is similar to the upload operation according to the first exemplary embodiment illustrated in FIG. 12A. However, in the second exemplary embodiment, the security-protection process can be executed after shooting; thus, for example, in a case where determination is made, in step S1202 illustrated in FIG. 12A, that an image to be uploaded includes a security-protection target (Yes in step S1202), controller 210 may execute the security-protection process based on the security mode that has been set, in addition to or instead of the warning display in step S1204.

Note that in the second exemplary embodiment, the configuration in which digital camera 100 executes the security-protection process after shooting has been given as an example, but the configuration according to the second exemplary embodiment may include the configuration according to the first exemplary embodiment. That is, digital camera 100 according to the second exemplary embodiment may have a configuration in which the security-protection process can be selected before shooting.

Accordingly, digital camera 100 according to the second exemplary embodiment allows the user to select a desired security mode from the plurality of security modes after shooting. Therefore, for example, when the user uploads image data shot with a digital camera that is not capable of executing the security-protection process before shooting, digital camera 100 according to the second exemplary embodiment can execute an appropriate security-protection process on the image data before upload of the image. This configuration allows an appropriate security-protection process to be executed before uploading.

In addition, the user may desire to set the security mode to ON after shooting even in a case where the user shoots with digital camera 100 according to the first exemplary embodiment, with the security mode set to OFF before shooting. Even in such a case, digital camera 100 according to the second exemplary embodiment can execute an appropriate security-protection process before uploading.

Third Exemplary Embodiment

Digital camera 100 according to the third exemplary embodiment allows the user to select a desired playback mode from a plurality of playback modes for playback of images recorded in memory card 230. Note that, in the third exemplary embodiment, particularly as an example of the above-described "playback of images", playback of images for the user to select an image to be uploaded will be given.

The plurality of playback modes include at least three playback modes. A first playback mode is a mode for playing back only an image of the processed image data. That is, in the first playback mode, of images recorded in memory card 230, only an image on which the security-protection process has been executed is displayed on display monitor 260.

A second playback mode is a mode for playing back only an image of the unprocessed image data. That is, in the second playback mode, of images recorded in memory card 230, only an image on which the security-protection process has not been executed is displayed on display monitor 260. The image on which the security-protection process has not been executed may be any one of an image shot with the imaging apparatus of the present disclosure with the security mode set to OFF and an image shot with an imaging apparatus other than the imaging apparatus of the present disclosure.

A third playback mode is a mode for playing back respective images of the unprocessed image data and the processed image data. That is, in the third playback mode, all images recorded in memory card 230 are displayed on display monitor 260.

Note that in a case where the user sets any one of the playback modes, the user can set the security mode before or after setting digital camera 100 to any one of the playback modes. A method for setting the security mode is identical to the method according to the first exemplary embodiment illustrated in FIG. 4.

An upload operation according to the third exemplary embodiment will be described below with reference to FIG. 12B. First, the user uses operation member 250 to select a playback mode (S1210).

In step S1210, in a case where the user selects a playback mode for playing back only an image of the processed image data, digital camera 100 makes transition to step S1211. In step S1211, controller 210 causes display monitor 260 to play back only an image of the processed image data.

Next, in a case where the user uses operation member 250 to determine an image to be uploaded (S1212), data transfer unit 270 uploads the determined image onto, for example, an SNS (S1213). Then, the upload process ends.

In the above-described flow from step S1211 to step S1213, only an image of the processed image data is played back; thus, a flow for checking necessity or unnecessity of the security-protection process is skipped. Therefore, the processing time is shortened.

On the other hand, in a case where a playback mode for playing back only an image of the unprocessed image data is selected in the selection of playback mode of step S1210, digital camera 100 proceeds to step S1214. In step S1214, controller 210 causes display monitor 260 to play back only an image of the unprocessed image data.

Next, in a case where the user uses operation member 250 to determine an image to be uploaded (S1215), transition is made to step S1216. In step S1216, step S1201 to step S1205 illustrated in FIG. 12A are executed.

An example of step S1216 will be described below. First, determination is made as to whether the image determined in step S1215 includes personal information (step S1201). In a case where the image includes personal information (Yes in step S1201, determination is made as to whether the image includes a security-protection target in accordance with the security mode that has been set (step S1202). In a case where the determined image includes a security-protection target (Yes in step S1202), the warning display is output (S1204), and the user inputs a final instruction whether to upload the image (S1205). Next, in a case where determination is made that the upload process is executed in accordance with the user's instruction (Yes in S1205), the upload process is executed (S1203). Then, the upload process ends.

Note that the security-protection process may be executed in step S1205 before the image is uploaded.

In the flow from step S1214 to step S1216, only the image of the unprocessed image data is played back; thus, the flow for checking necessity or unnecessity of the security-protection process (steps S1201 to S1205) is executed. Therefore, leakage of personal information can be prevented when the image is uploaded.

Further, in a case where, in step S1210, the user selects a playback mode for playing back both images of the processed image data and the unprocessed image data, digital camera 100 proceeds to step S1217. In step S1217, controller 210 causes display monitor 260 to play back both the images of the processed image data and the unprocessed image data.

Next, in a case where the user uses operation member 250 to determine an image to be uploaded (S1212), controller 210 determines whether the determined image is of the processed image data (S1219).

In step S1219, in a case where determination is made that the image is of the processed image data (Yes in S1219), data transfer unit 270 uploads the determined image onto, for example, an SNS (S1220). Then, the upload process ends.

On the other hand, in step S1219, in a case where determination is made that the image is not of the processed image data (No in S1219), controller 210 proceeds to step S1216. In step S1216, as described above, the upload process is executed after the flow for checking necessity or unnecessity of the security-protection process. Then, the upload process ends.

In the flow from step S1217 to step S1220, both the images of the processed image data and the unprocessed image data are played back; thus, controller 210 determines whether the image to be uploaded is of the processed image data or of the unprocessed image data. Then, controller 210 executes the flow for checking necessity or unnecessity of the security-protection process on the image of the unprocessed image data. On the other hand, the flow for checking necessity or unnecessity of the security-protection process is skipped for the image of the processed image data. Therefore, personal information can be protected when the image is uploaded. Furthermore, an unnecessary processing time is shortened.

Accordingly, in the third exemplary embodiment, the user can select a desired playback mode from the plurality of playback modes. The plurality of playback modes include a playback mode for playing back only an image of the processed image data, a playback mode for playing back only an image of the unprocessed image data, and a playback mode for playing back both the images of the processed image data and the unprocessed image data. With this configuration, in the third exemplary embodiment, personal information is protected at the time of upload. Furthermore, an unnecessary processing time is shortened.

Note that, in the third exemplary embodiment, the playback mode at the time of upload has been given as an example, but the playback mode is applicable to various types of playback such as playback for printing, playback for viewing, and playback for data transfer.

Furthermore, the playback mode according to the third exemplary embodiment is applicable to playback of an image recorded according to the first exemplary embodiment or the second exemplary embodiment.

Fourth Exemplary Embodiment

In the fourth exemplary embodiment, the user can configure the details settings of the security mode at least before shooting or after shooting. Furthermore, in the fourth exemplary embodiment, the target subject can be set based on the registered face information. Furthermore, in the fourth exemplary embodiment, options for the target subject include an option for making reference to necessity or unnecessity of the security-protection process on a profile.

Figure 15:
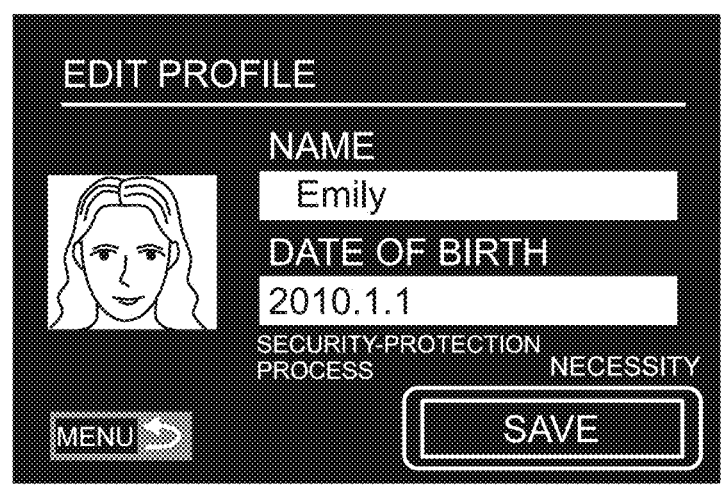
FIG. 15 is a diagram illustrating a screen showing registration information according to the fourth exemplary embodiment.

The profile corresponds to personal information registered in memory card 230. FIG. 15 illustrates an example of a screen on which a profile registered in memory card 230 is displayed by display monitor 260. The profile has a face photograph, a name, and a date of birth of an individual that can be a subject, and necessity or unnecessity of the security-protection process registered therein. In the fourth exemplary embodiment, a face (face photograph) registered in the profile is used for personal authentication. More specifically, "necessity or unnecessity of the security-protection process" may refer to "permission or non-permission to post personal information onto an SNS". For example, in the profile illustrated in FIG. 15, "necessity" of the security-protection process for Emily is recorded.

Figure 14:
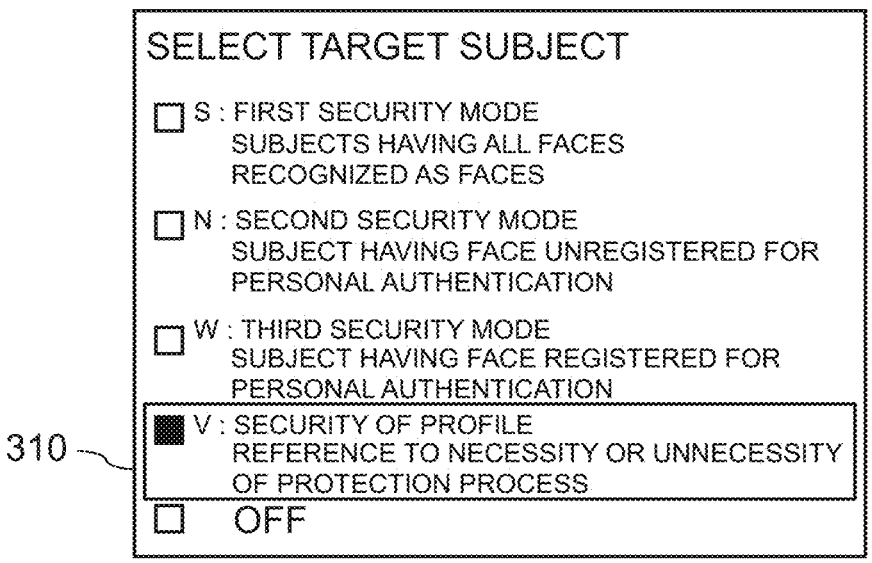
FIG. 14 is a diagram illustrating a screen of a detailed setting of the security mode according to a fourth exemplary embodiment.

When the user sets the security mode at least before shooting or after shooting, the user can set a target subject on a screen of display monitor 260 as illustrated in FIG. 14. When the user selects target subject V, controller 210 sets the target subject by reference to necessity or unnecessity of the security-protection process in the profile. That is, Emily illustrated in FIG. 15 is set as the target subject.

Therefore, for example, in a case where the security mode for target subject V is set before shooting, controller 210 causes, during shooting, the detector (denoted as 190 in FIG. 1) to execute face recognition to determine whether a face included in the subject is identical to the face of Emily. In a case where controller 210 determines that the faces are identical to each other, controller 210 determines, by reference to the profile of Emily, whether "necessity" of the security-protection process is recorded. In a case where controller 210 determines that "necessity" of the security-protection process is recorded, Emily becomes the target subject. Then, the security-protection process is executed on personal information on Emily (for example, a face, a fingerprint, and a name tag) in accordance with the security mode that has been set.

On the other hand, in a case where the security mode is set after shooting, controller 210 causes the detector (denoted as 190 in FIG. 1) to execute face recognition on a desired image read from memory card 230. Then, controller 210 causes detector 190 to determine whether a face included in a subject in the image is identical to the face of Emily. In a case where controller 210 determines that the faces are identical to each other, controller 210 determines, by reference to the profile of Emily, whether "necessity" of the security-protection process is recorded. In a case where controller 210 determines that "necessity" of the security-protection process is recorded, Emily becomes the target subject. Then, the security-protection process is executed on personal information on Emily (for example, a face, a fingerprint, and a name tag) in accordance with the security mode that has been set.

Note that, in FIG. 14, a configuration in which the options for the target subject include target subject S is described. Herein, target subject S corresponds to a mode in which all subjects having their respective faces recognized as faces are subject targets, regardless of presence or absence of the registration information. However, as illustrated in FIG. 16, the options for the target subject need not include target subject S. That is, the example illustrated in FIG. 16 has a configuration in which the target subject can be selected based on at least one of presence or absence of the registration information and necessity or unnecessity of the security-protection process in the profile. Note that, in the example illustrated in FIG. 16, target subject V and target subject N are selected. Accordingly, target subject V, that is, an individual for which "necessity" of the security-protection process is recorded in the profile, and target subject N, that is, an individual who is unregistered for the personal authentication are target subjects.

In summary, in the fourth exemplary embodiment, controller 210 is configured to execute at least one of the following first to third controls.

The first control is applied to a case where target subject W illustrated in FIG. 16 is set. In a case where a face detected by detector 190 is identical to recorded face information, controller 210 causes detector 190 to detect a security-protection target associated with the face. That is, the security-protection process is executed on a security-protection target of a subject registered for the personal authentication.

The second control is applied to a case where target subject N is set. In a case where the face detected by detector 190 is not identical to the recorded face information, controller 210 causes detector 190 to detect a security-protection target associated with the face. That is, the security-protection process is executed on a security-protection target of a subject unregistered for the personal authentication.

The third control is applied to a case where target subject V is set. In a case where the face detected by detector 190 is identical to the recorded face information and registration information includes information indicating that the face information is associated with a security-protection target, controller 210 causes detector 190 to detect the security-protection target associated with the face. The registration information corresponds to profile information. The information indicating that the face information is associated with a security-protection target corresponds to, for example, information indicating "necessity of the security-protection process" associated with the profile.

Accordingly, in the fourth exemplary embodiment, personal information included images can be protected with reference to registered face information.

Furthermore, the registration information such as the profile may include time information indicating a period during which the security-protection process is executed on the security-protection target associated with the face information. That is, the user may set, in the profile, a period during which "necessity" of the security-protection process is maintained. For example, the user can make a setting such that "necessity" of the security-protection process is maintained until Emily illustrated in FIG. 15 is 20 (until Jan. 1, 2030).

This configuration improves user convenience in protection of personal information included in images.

Other Exemplary Embodiments

As described above, the first to fourth exemplary embodiments have been described to exemplify the technique disclosed in the present application. However, the technique in the present disclosure is not limited thereto, and can also be applied to exemplary embodiments subjected to alteration, substitution, addition, omission and the like. In addition, new exemplary embodiments can be made by combining constituents described in the above exemplary embodiments.

Therefore, other exemplary embodiments will be described below.

In the first exemplary embodiment, the mask process executed by image processor 170 has been given as an example, in which stamp data preregistered before shooting is superimposed on the security-protection target or the security-protection target is replaced with the stamp data. However, the stamp data may be updated, or new stamp data may be added after shooting. Therefore, another configuration may be employed in which, after shooting, images that have been recorded are read out, and the mask process is executed on the images with new stamp data. This configuration increases the number of options for the security mode that meet user's preferences.

Furthermore, the mask process executed by image processor 170 may be a process in which the security-protection target is replaced with low resolution data having its resolution lowered by a filtering process or with out of focus image data.

Furthermore, in the first exemplary embodiment, in a situation where a still image on which the security-protection process needs to be executed is to be uploaded, the security-protection process may be executed as a post process in step S1205 illustrated in FIG. 12A.

Furthermore, in the first exemplary embodiment, digital camera 100 includes data transfer unit 270 that uploads the processed image data; however, digital camera 100 need not necessarily include data transfer unit 270. In a case where digital camera 100 does not include data transfer unit 270, the processed image data may be uploaded by, for example, a smartphone.

Further, in the first exemplary embodiment, description has been given of the case where the security-protection process is executed at the time of shooting of a still image in the security mode that has been set; however, the security-protection process may be also executed at the time of shooting of a moving image in the security mode that has been set. On each frame in a moving image, a process similar to the security-protection process according to the first exemplary embodiment that is executed on a still image may be executed.

Furthermore, in the first exemplary embodiment, the mask process, the blur process, and the pixelation process have been given as examples of the security-protection process; however, any other process such as a clipping process may be employed, provided that personal information can be protected.

Furthermore, in the first exemplary embodiment, three options, that is, a face and a fingerprint, a face and a name tag, and a face, a fingerprint, and a name tag have been given as examples of the options for the security-protection target; however, other options such as only a face, only a fingerprint, and only a name tag may be employed.

Furthermore, in the first exemplary embodiment, the mask process and the blur process illustrated in part (c) of FIG. 4 have been given as examples of the options for the security-protection process on a face; however, another pixelation process may be employed.

Furthermore, in the first exemplary embodiment, the configuration in which the security-protection process on a fingerprint and a name tag is predetermined to be the blur process has been given as an example; however, the user may select the security-protection process in the same manner as on a face. Alternatively, the security-protection process on a fingerprint and a name tag may be determined to be, for example, another pixelation process. Further, the security-protection process on a fingerprint may be different from the security-protection process on a name tag.

Furthermore, in the first exemplary embodiment to the fourth exemplary embodiment, controller 210 may cause memory card 230 to delete processed image data after upload. To be more specific, as illustrated in FIG. 17, the imaging apparatus may be configured to allow the user to select a setting of "/3: Delete processed image data after upload" on the screen of a detailed setting of the security mode (corresponding to detailed setting 4 according to the first exemplary embodiment). This configuration makes it possible to reduce the amount of data to be recorded in memory card 230.

Furthermore, in the first exemplary embodiment to the fourth exemplary embodiment, the configuration in which a desired security mode can be selected from the plurality of security modes has been given as an example; however, a configuration in which the security mode set before shooting can be applied at the time of upload, regardless of whether the security mode can be selected, also improves user convenience.

That is, in a case where the security mode is set in accordance with the setting screens illustrated in FIG. 3 and FIG. 4 before shooting, the same security mode may be applied at the time of upload. In this case, determination is made as to whether the security-protection process is executed on the security-protection target of the target subject in the image to be uploaded, based on the security mode that has been set.

Then, in a case where determination is made that the security-protection process has yet to be executed, the security-protection process may be executed in accordance with the security mode. Then, after the process ends, the image may be uploaded.

On the other hand, in a case where determination is made that the security-protection process has been executed, upload may be executed without any other condition.

This configuration allows the user to easily upload an image in which personal information has been protected. Note that such an imaging apparatus may be defined as follows. That is, the imaging apparatus is an imaging apparatus in which the security mode can be set before shooting, and when an image that has been shot with an imaging apparatus other than this imaging apparatus and on which the security-protection process has not been executed or an image that has been shot with this imaging apparatus and on which the security-protection process has not been executed is uploaded as an image on which the security-protection process has not been executed, the image is uploaded after the security-protection process is executed according to the security mode set at the time of upload.

The present disclosure is applicable to an imaging apparatus configured to perform effective security measures at the time of upload of a still image or a moving image onto, for example, an SNS. Specifically, the present disclosure is applicable to digital cameras, smartphones and tablet terminals with a camera function, and other similar devices.

What is claimed is:

1. An imaging apparatus comprising:
   a storage configured to record registration information for personal authentication, the registration information including face information;
   an image sensor configured to generate first image data from optical information;
   a controller configured to:
      select a security mode from a plurality of security modes, each of the plurality of security modes having a unique security-protection target;
      detect a face of a subject within the first image data; and
      detect the security-protection target according to a result from a comparison between the detected face and the face information included in the registration information;
   an image processor configured to execute a security-protection process on the detected security-protection target to generate second image data;
   wherein the controller is further configured to:
      detect the security-protection target in accordance with the security mode selected, and
      cause the image processor to execute the security-protection process in accordance with the security mode selected,
   wherein the plurality of security modes include a third security mode, the third security mode being a mode in which:
      the face information is set as the security protection target in a case where the registration information includes information indicating that the face information is associated with the security protection target and
      the face information is not set as the security protection target in a case where the registration information does not include information indicating that the face information is associated with the security protection target;
   wherein the registration information includes time information indicating a period during which the security-protection process is executed on the security-protection target associated with the face information; and
   wherein the time information is set based on age of the security protection target, such that the security-protection process is executed on the security-protection target until the security-protection target reaches a certain age based on a birthdate of the security-protection target.

2. The imaging apparatus according to claim 1, wherein the controller is configured to select the security mode before shooting.

3. The imaging apparatus according to claim 1, wherein the controller causes the image processor to simultaneously generate the first image data and the second image data.

4. The imaging apparatus according to claim 1, wherein the security-protection process is at least one of a blur process, a pixelation process, and a mask process.

5. The imaging apparatus according to claim 1, further comprising a network interface configured to upload image data including the second image data.

6. The imaging apparatus according to claim 5, wherein the controller is configured to determine whether the image data to be uploaded by the network interface is the second image data.

7. The imaging apparatus according to claim 1, wherein the controller is configured to determine whether image data to be uploaded is in accordance with the security mode selected before shooting.

8. The imaging apparatus according to claim 1, wherein the plurality of security modes include a first security mode and a second security mode, the first security mode being a mode in which another face information not included in the registration information is set as the security protection target, the second security mode being a mode in which the face information included in the registration information is set as the security protection target.

9. An imaging apparatus comprising:
   a storage configured to record registration information for personal authentication, the registration information including face information:
   an image sensor configured to generate first image data from optical information;
   a controller configured to:
      select a security mode from a plurality of security modes, each of the plurality of security modes having a unique security-protection target;
      detect a face of a subject within the first image data;
      detect the security-protection target according to a result from a comparison between the detected face and the face information included in the registration information;

an image processor configured to execute a security-protection process on the detected security-protection target to generate second image data;

wherein the controller is further configured to:
  detect the security-protection target in accordance with the security mode selected, and
  cause the image processor to execute the security-protection process in accordance with the security mode selected, wherein the plurality of security modes include a first security mode and a second security mode, the first security mode being a mode in which another face information not included in the registration information is set as the security protection target, the second security mode being a mode in which the face information included in the registration information is set as the security protection target, and wherein the security-protection target includes the face information and identification information, other than the face information, for identifying an individual, and the security-protection process executed on the face information is different from the security-protection process executed on the identification information other than the face information.

10. An imaging apparatus comprising:

a storage configured to record registration information for personal authentication, the registration information including face information;

an image sensor configured to generate first image data from optical information;

a controller configured to:
  select a security mode from a plurality of security modes, each of the plurality of security modes having a unique security-protection target;
  detect a face of a subject within the first image data;
  detect the security-protection target according to a result from a comparison between the detected face and the face information included in the registration information;

an image processor configured to execute a security-protection process on the detected security-protection target to generate second image data;

wherein the controller is further configured to:
  detect the security-protection target in accordance with the security mode selected, and
  cause the image processor to execute the security-protection process in accordance with the security mode selected, a network interface configured to upload image data including the second image data, wherein:
  the plurality of security modes include a first security mode and a second security mode, the first security mode being a mode in which another face information not included in the registration information is set as the security protection target, the second security mode being a mode in which the face information included in the registration information is set as the security protection target,
  the storage is configured to store the second image data, and
  the controller causes the storage to delete the second image data after the second image data is uploaded.

* * * * *